(12) United States Patent
Shi et al.

(10) Patent No.: US 8,281,138 B2
(45) Date of Patent: Oct. 2, 2012

(54) STEGANALYSIS OF SUSPECT MEDIA

(75) Inventors: Yun-Qing Shi, Millburn, NJ (US); Bin Li, Shenzhen (CN)

(73) Assignee: New Jersey Institute of Technology, Newark, NJ (US)

( * ) Notice: Subject to any disclaimer, the term of this patent is extended or adjusted under 35 U.S.C. 154(b) by 526 days.

(21) Appl. No.: 12/422,677

(22) Filed: Apr. 13, 2009

(65) Prior Publication Data

US 2010/0091981 A1  Apr. 15, 2010

Related U.S. Application Data

(60) Provisional application No. 61/044,595, filed on Apr. 14, 2008.

(51) Int. Cl.
*H04L 9/32* (2006.01)

(52) U.S. Cl. ............. 713/176; 380/28; 380/54; 382/251

(58) Field of Classification Search .................. 713/176; 380/28, 54; 382/251
See application file for complete search history.

(56) References Cited

U.S. PATENT DOCUMENTS

| 5,930,369 | A * | 7/1999 | Cox et al. ......................... 380/54 |
| 7,529,384 | B2 * | 5/2009 | Subbalakshmi et al. ....... 382/100 |
| 7,542,587 | B2 * | 6/2009 | Tian et al. ...................... 382/100 |
| 2006/0176299 | A1 * | 8/2006 | Subbalakshmi et al. ....... 345/421 |
| 2008/0205780 | A1 * | 8/2008 | Fridrich et al. ............... 382/244 |

OTHER PUBLICATIONS

Guillermito, "Extracting Data Embedded with JSteg", Feb. 18, 2004, pp. 1-8.*

Bayram, Sevinç, et al., "Image Manipulation Detection," *Journal of Electronic Imaging*, Oct.-Dec. 2006, 15(4): 17 pages.

Böhme, Rainer, et al., "Breaking Cauchy Model-based JPEG Steganography with First Order Statistics," *Proc. 9th European Symposium on Research in Computer Security (ESRICS)*, Sophia Antipolis, French Riviera, France, Sep. 2004, 16 pages.

Cachin, Christian, "An Information-Theoretic Model for Steganography," *Proc. 2nd Workshop on Information Hiding*. Lecture Notes in Computer Science, Springer, 1998, 12 pages.

Chandramouli, Rajarathnam, et al., "Image Steganography and Steganalysis: Concepts and Practice," *Proc. 2nd Int. Workshop Digital Watermarking*, Seoul, Korea, Oct. 2003, pp.-35-49.

Chen, Brian, et al., "Quantization Index Modulation: A Class of Provably Good Methods for Digital Watermarking and Information Embedding," *IEEE Transaction on Information Theory*, May 2001, 47(4):1423-1443.

(Continued)

*Primary Examiner* — Samson Lemma
(74) *Attorney, Agent, or Firm* — Hope Baldauff Hartman, LLC

(57) ABSTRACT

Techniques described herein are generally related to steganalysis of suspect media. Steganalysis techniques may include receiving instances of suspect media as input for steganalytic processing. A first set of quantized blocks of data elements may be identified within the media, with this first set of blocks being eligible to be embedded with steganographic data. A second set of quantized blocks of data elements may be identified within the media, with this second set of blocks being ineligible to be embedded with steganographic data. The steganalysis techniques may requantize the first and second blocks. In turn, these techniques may compare statistics resulting from requantizing the first block with statistics resulting from requantizing the second block. The steganalysis techniques may then assess whether the first block of data elements is embedded with steganographic features based on how the statistics of the second blocks compare with the statistics of the first blocks.

24 Claims, 12 Drawing Sheets

OTHER PUBLICATIONS

Chen, Chunhua, et al., "JPEG Image Steganalysis Utilizing Both Intrablock and Interblock Corrections," *ISCAS 2008. IEEE International Symposium on Circuits and Systems*, May 2008, pp. 3029-3032. Abstract.

Farid, Hany, et al., "Higher-Order Wavelet Statistics and their Application to Digital Forensics," *IEEE Workshop on Statistical Analysis in Computer Vision (in conjunction with CVPR)*, Madison, Wisconsin, 2003, 8 pages.

Fridrich, Jessica, et al., "Attacking the OutGuess," *Proc. ACM Workshop on Multimedia and Security*, Juan-les-Pins, France, Dec. 2002, 5 pages.

Fridrich, Jessica, "Feature-Based Steganalysis for JPEG Images and its Implications for Future Design and Steganographic Schemes," *Proc. 6th Int. Workshop on Information Hiding*, Toronto, Canada, May 2004, 15 pages.

Fridrich, Jessica, et al.., "Perturbed Quantization Steganography," *ACM Multimedia and Security Journal*, 2005, 11(2):98-107.

Fridrich, Jessica, et al., "Statistically Undetectable JPEG Steganography: Dead Ends, Challenges, and Opportunities," *Proc. 9th ACM Workshop in Multimedia and Security*, Dallas, Texas, Sep. 2007, 11 pages.

Fridrich, Jessica, et al., "Steganalysis of JPEG Images: Breaking the F5 Algorithm," *Proc. 5th Int. Workshop on Information Hiding*, Noordwijkerhout, Netherlands, Oct. 2002, 15 pages.

Fu, Dongdong, et al., "JPEG Steganalysis Using Empirical Transition Matrix in Block DCT Domain," *IEEE 8th Workshop on Multimedia Signal Processing*, BC, Canada, Oct. 2006, 4 pages.

Hetzl, Stefan, et al., "A Graph-Theoretic Approach to Steganography," *Proc. 9th Int. Conf. Communications and Multimedia Security*, Salzburg, Austria, 2005, 10 pages.

JSTEG, accessed Oct. 17, 2008 from http://zooid.org/~paul/crypto/jsteg/README.jsteg, 2 pages.

Kim, Younhee, et al., "Modified Matrix Encoding Technique for Minimal Distortion Steganography," *Proc. 8th Int. Workshop on Information Hiding*, Old Town Alexandria, Virginia, Jul. 2006, Abstract.

Kodovský, Jan, et al., "Influence of Embedding Strategies on Security of Steganographic Methods in the JPEG Domain," *Proc. Electronic Imaging, Security, Forensics, Steganography, and Watermarking on Multimedia Contents X, SPIE*, San Jose, California, Jan. 2008, 13 pages.

Kschischang, Frank R., et al., "Factor Graphs and the Sum-Product Algorithm," *IEEE Transaction on Information Theory*, Feb. 2001, 47(2):498-519.

Li, Bin, et al., "Detecting Doubly Compressed JPEG images by using Mode Based First Digit Features," Oct. 2008, *Proceedings in IEEE Intl. Workshop on Multimedia Signal Processing*, Cairns, Australia, Oct. 8-10, 2008. Abstract.

Luo, Xiang-Yang, et al., "A Review of Blind Detection for Image Steganography," *Signal Processing*, Sep. 2008, 88(9):2138-2157. Abstract.

Lyu, Siwei, et al., "Detecting Hidden Messages Using Higher-Order Statistics and Support Vector Machines," *Proc. 5th Int. Workshop on Information Hiding*, Noordwijkerhout, Netherlands, Oct. 2002, 15 pages.

Malik, Hafiz, et al., "Steganalysis of GIM-based Data Hiding Using Kernel Density Estimation," *Proc. 9th Workshop of Multimedia and Security*, Dallas, Texas, Sep. 2007, pp. 149-160.

Pevný, Thomaáš, et al., "Detection of Double-Compression in JPEG images for Applications in Steganography," *IEEE Transactions on Information Security and Forensics*, 2008, 3(2):247-258.

Pevný, Thomaáš, et al., "Merging Markov and DCT Features for Multi-Class JPEG Steganalysis," *Proc. Electronic Imaging Security, Steganography, and Watermarking of Multimedia Contents IX, SPIE*, San Jose, California, Jan. 2007, 13 pages.

Provos, Niels, "Defending Against Statistical Steganalysis," *Proc. 10th USENIX Security Symposium*, Washington D.C., USA, Aug. 2001, 13 pages.

Sallee, Phil, "Model-Based Methods for Steganography and Steganalysis," *International Journal of Image and Graphics*, Jan. 2005, 5(1):167-189.

Sallee, Phil, "Model-based Steganography," *Proc. 2nd Int. Workshop on Digital Watermarking*, Seoul, Korea, Oct. 2003, 29 pages.

Sarkar, Anindya, et al., "Further Study on YASS: Steganography Based on Randomized Embedding to Resist Blind Steganalysis," *Proc. Electronic Imaging, Security, Forensics, Steganography, and Watermarking on Multimedia Contents X, SPIE*, San Jose, California, Jan. 2008, 11 pages.

Sarkar, A., et al., "Secure Steganography: Statistical Restoration of the Second Order Dependencies for Improved Security," *Proc. IEEE Int. Conf. on Acoustics, Speech, and Signal Processing*, Honolulu, Hawaii, Apr. 2007, pp. 277-280.

Shi, Yun Q., et al., "A Markov Process Based Approach to Effective Attacking JPEG Stenography," 2007. *Lecture Notes in Computer Science*, vol. 4437/2007, pp. 249-264. Abstract only.

Shi, Yun Q., et al., "A Natural Image Model Approach to Splicing Detection," *Proc. ACM Workshop on Multimedia and Security*, Dallas, Texas, Sep. 2007, pp. 51-62.

Shi, Yun Q., et al., "Steganalysis versus Splicing Detection," *Proc. 7th Int. Workshop on Digital Watermarking*, Guangzhou, China, Dec. 2007, 15 pages.

Solanki, Kaushal, et al., "YASS: Yet Another Steganographic Scheme that Resists Blind Steganalysis," *Proc. 9th Int. Workshop on Information Hiding*, Saint Malo, France, Jun. 2007, 15 pages.

Sullivan, K., et al., "Steganalysis of Quantization Index Modulation Data Hiding," *Proc. IEEE Int. Conf. Image Processing*, Singapore, Oct. 2004, vol. 2, pp. 1165-1168.

Wallace, Gregory E., "The JPEG Still Picture Compression Standard," *Communication of ACM*, 1991, 34(4):30-44.

Wang, Huaiqing, et al., "Cyber Warfare: Steganography vs. Steganalysis," *Communications of the ACM*. Oct. 2004, 47(10):76-82.

Webb, Andrew, *Statistical Pattern Recognition*, 2nd Edition, 2002. John Wiley and Sons Ltd., Preface, Table of Contents, 5 pages.

Westfeld, Andreas, "F5-A Steganographic Algorithm: High Capacity Despite Better Steganalysis," *Proc. 4th Int. Workshop on Information Hiding*, Pittsburg, Pennsylvania, Apr. 2001, pp. 289-302.

Xuan, Guorong, et al., "Steganalysis Based on Multiple Features Formed by Statistical Moments of Wavelet Characteristic Functions," *Proc. 7th Int. Workshop in Information Hiding*, Barcelona, Spain, Jun. 2005, 16 pages.

\* cited by examiner

STEGANALYSIS OF SUSPECT MEDIA

PRIORITY CLAIM AND CROSS-REFERENCE TO RELATED APPLICATION

This application claims the benefit of the filing date of U.S. Provisional Patent Application Ser. No. 61/044,595, entitled "Steganalysis of YASS", filed on 14 Apr. 2008 (hereinafter referred to as 'Related Application'), to the fullest extent permitted under 35 USC §119(e). All subject matter contained within the Related Applications is incorporated herein by this reference as if set forth verbatim herein, to the extent such subject matter is not inconsistent herewith.

BRIEF DESCRIPTION OF THE FIGURES

The foregoing and other features will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
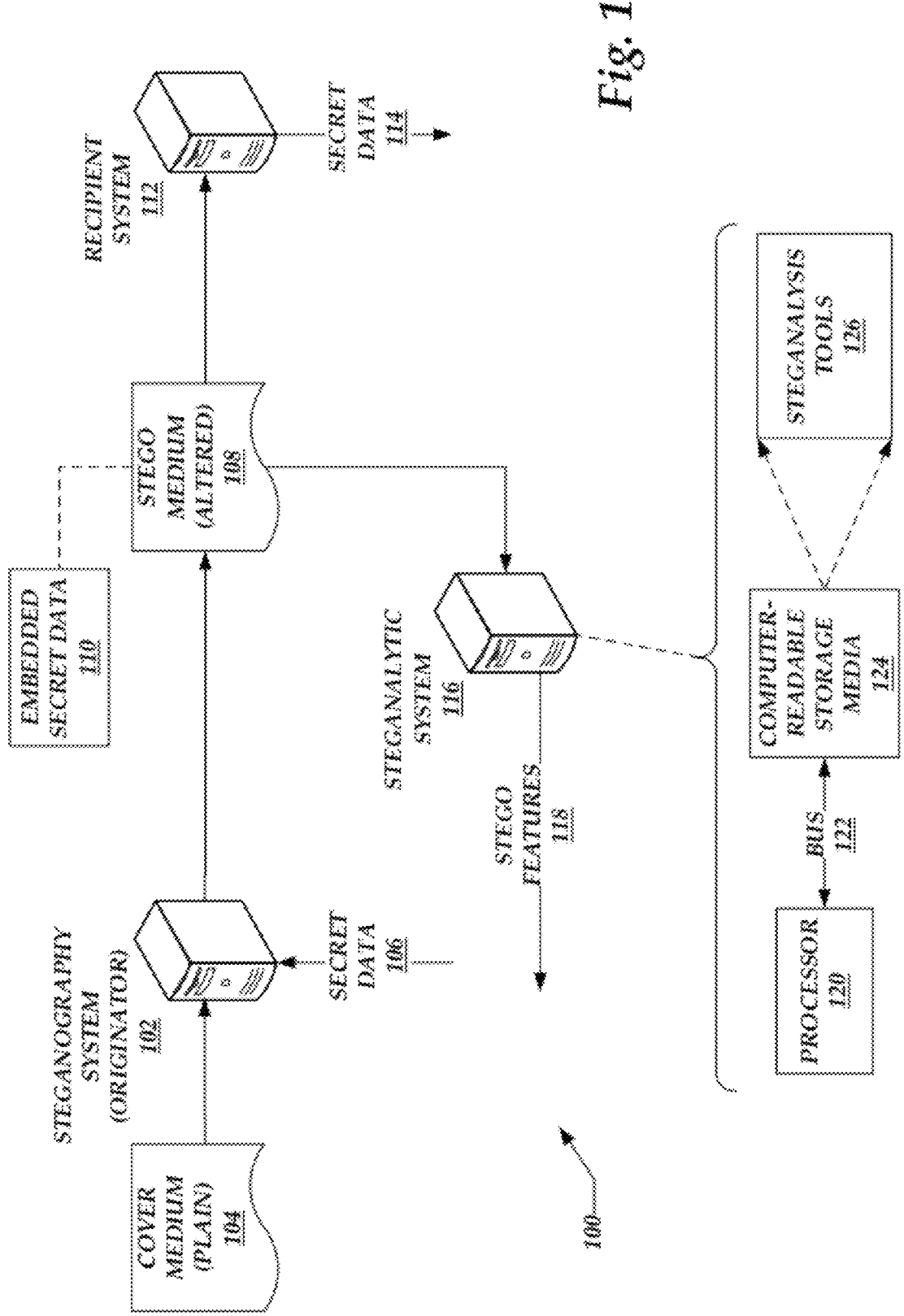
FIG. 1 is a block diagram illustrating an example process and operating environment suitable for performing steganalysis of suspect media.

In the following detailed description, reference is made to the accompanying drawings, which form a part hereof. In the drawings, similar symbols typically identify similar components, unless context dictates otherwise. In addition, the first digit of the symbols generally indicates the drawing in which this symbol first appears. For example, the symbol "202" would refer to an element shown for the first time in FIG. 2.

The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Described herein, inter alia, are methods, apparatus, computer programs and systems related to steganalysis of suspect media. Steganalysis techniques may include receiving instances of suspect media as input for steganalytic processing. A first set of quantized blocks of data elements may be identified within the media, with this first set of blocks being eligible to be embedded with steganographic data. A second set of quantized blocks of data elements may be identified within the media, with this second set of blocks being ineligible to be embedded with steganographic data. The steganalysis techniques may requantize the first and second blocks. In turn, these techniques may compare statistics resulting from requantizing the first block with statistics resulting from requantizing the second block. The steganalysis techniques may then assess whether the first block of data elements is embedded with steganographic features based on how the statistics of the second blocks compare with the statistics of the first blocks.

Steganography refers to techniques for communicating covertly by embedding secret information in otherwise unsuspicious media. Utilizing a plain medium to carry secret information may be one goal of steganography. The plain medium may be called a cover medium, and the medium that is embedded with secret information may be called a stego-medium. Modern steganography has progressed to such an extent that it may be virtually impossible for human perception to distinguish stego-media from unaltered cover media. Hence, the mission of revealing the presence of such covert communications relies on designing steganalytic techniques that may receive instances of suspect media for analysis, and that effectively detect whether the suspect media is a stego-medium that is embedded with secret information.

FIG. 1 is a block diagram illustrating an example process 100 and operating environment suitable for performing steganalysis of suspect media in accordance with the present disclosure. An example steganography system 102 may receive as input one or more instances of an unaltered or plain cover medium or media 104. The cover media 104 may take any form recognized as suitable for performing the techniques described herein. However, without limiting possible implementations, this description provides examples in which the cover media 104 may be JPEG images, which are compliant with standards promulgated by the Joint Photographic Experts Group (JPEG).

JPEG images are recognized as suitable plain media for steganography, largely due to their pervasive application and use in contemporary daily life. The steganography system 102 may employ any number of several different steganographic schemes that have been proposed to embed secret data 106 into the cover media 104. More specifically, the steganography system 102 may embed this secret data by, for example, altering JPEG discrete cosine transform (DCT) coefficients within the cover media 104. The steganography system 102 may output a stego-medium or media 108, which may contain embedded secret data 110 that represents the secret data 106 as converted, reprocessed, or reformatted as appropriate for embedding in the stego-medium 108.

The steganography system 102 may transmit or otherwise make the stego-media 108 available to one or more recipient systems 112. For example, the steganography system 102 may transmit the stego-media 108 over one or more networks (not shown in FIG. 1) to the recipient systems 112. For the purposes of providing this description, this discussion refers to the steganography system 102 as an originator or originating system, which may communicate covertly with the recipient systems 112 using the stego-media 108.

In turn, the recipient systems 112 may receive the stego-media 108, and may employ steganographic techniques to extract the secret data embedded in the stego-media 108. FIG. 1 denotes at 114 the secret data as extracted by the recipient systems 112 from input stego-media 108. It is noted that in some implementations of this description, the secret data 106 embedded by the originating systems 102 may be the same as the secret data 114 extracted by the recipient systems 112. However, in other implementations of this description, the secret data 106 embedded by the originating systems 102 may be different than the secret data 114 extracted by the recipient systems 112.

The operating environments for process 100 may include one or more steganalytic systems 116, which may be arranged to intercept communications from the steganography system 102, and analyze the intercepted communications to determine whether the intercepted communications include stego-media 108. More specifically, the steganalytic systems 116 may be arranged to analyze intercepted suspect media, to determine whether the suspect media is unaltered cover media (e.g., 104), or is altered stego-media (e.g., 108). In those cases where the steganalytic systems 116 determine that suspect media are stego-media 108, the steganalytic systems 116 may also extract stego features 118 from the stego-media 108, as described in further detail below.

In the scenario shown in FIG. 1, the steganalytic system 116 may function as a warden, situated "between" the originating steganography systems 102 and the recipient systems 112. In some implementation scenarios, the steganalytic system 116 may operate without the knowledge of the steganography systems 102 and/or the recipient systems 112. In other implementation scenarios, however, the steganalytic system 116 may cooperate with the steganography systems 102 to develop and refine techniques for steganography and/or steganalysis.

Turning to the steganalytic systems 116 in more detail, implementations of these systems 116 may include one or more processors 120, which may have a particular type or architecture, chosen as appropriate for particular implementations. The processors 120 may couple to one or more bus systems 122 chosen for compatibility with the processors 120.

The systems 116 may also include one or more instances of computer-readable storage medium or media 124, which may be coupled to one or more bus systems 122. The bus systems 122 may be configured to enable the processors 120 to transfer (i.e., read or write) code and/or data between the processor(s) 120 and the computer-readable storage media 124. The computer-readable storage media 124 may represent apparatus in the form of storage elements that are implemented using any suitable technology, including but not limited to semiconductor devices, magnetic material devices, optical devices, or the like. For example, the computer-readable storage media 124 may include memory components, whether classified as RAM, ROM, flash, or other types, and may also represent hard disk drives (HDDs). Further examples of the computer-readable media 110 may include removable media, such as compact disk read-only memories (CD-ROMs), digital versatile disks or digital video disks (DVDs), removable storage media communicating through a universal serial bus (USB) interface, or the like.

The computer-readable storage media 124 may be arranged to store and/or provide one or more modules of instructions that, when loaded into the processor 120 and executed, may cause the systems 116 to perform various techniques related to steganalysis of suspect media. As detailed throughout this description, these modules of instructions may also provide various means, tools, or techniques, denoted generally at 126, by which the steganalytic systems 116 may analyze and process suspect media. The steganalysis tools 126 may generally represent the components, flows, processes, decision logic, and data structures discussed in more detail throughout this description, with the subsequent drawings and description understood as elaborating on various aspects of the steganalysis tools 126.

Without limiting possible implementations, the steganalysis tools 126 are described in connection with identifying or revealing stego-media 108 that are output from steganography systems 102. In some implementations of this description, the steganography systems 102 may employ Yet Another Steganographic Scheme (YASS), which may be described as a steganographic algorithm that can use JPEG images to embed stego-media. However, in providing these examples that incorporate YASS, this description is not limited to steganalysis tools that attack YASS implementations. Instead, this description may be extended to steganalytic systems that attack other steganographic techniques as well. This description now provides an introductory discussion of JPEG compression, followed by more details on YASS.

JPEG compression is typically a lossy, rather than a lossless, compression scheme (although some lossless JPEG compression techniques may be available). In JPEG compression, an input image is first divided into 8×8 consecutive non-overlapping blocks. The data elements (e.g. pixels) in a given block are denoted as $d_{x,y}$, where $(x,y \in \{0, 1, \ldots, 7\})$. Then, each block is processed by a two-dimensional (2-D) discrete cosine transform (DCT), to obtain a 2-D array of 64 coefficients. This DCT is expressed by the following:

$$D_{u,v} = \varphi(u)\varphi(v) \sum_{x=0}^{7} \sum_{y=0}^{7} d_{x,y} \cos\left[\frac{\pi}{8}\left(x+\frac{1}{2}\right)u\right] \cos\left[\frac{\pi}{8}\left(y+\frac{1}{2}\right)v\right],$$

$$(u, v \in \{0, 1, \ldots, 7\})$$

where $\phi(0)=1/\sqrt{8}$ and $\phi(1)=1/2$, $1>0$.

$D_{0,0}$ may be referred to as a DC coefficient, and the other 63 coefficients are termed AC coefficients. All coefficients located in the same position (u,v) within each 2-D array from the entire image form a mode, also called a sub-band. Next, each transformed coefficient undergoes JPEG quantization (i.e., being divided by a corresponding quantization step, denoted by $q_{u,v}$), followed by rounding the coefficients to the nearest integer:

$$R_{u,v} = \text{round}\left(\frac{D_{u,v}}{q_{u,v}}\right)$$

where $R_{u,v}$ denotes the resultant quantized JPEG DCT coefficient.

Typically, the foregoing operations are not reversible. Put differently, some information is typically lost during the rounding. To avoid confusion, this description refers to the coefficients after performing DCT, but before quantization, as DCT coefficients (i.e., $D_{u,v}$). This description also refers to DCT coefficients after division of quantization steps, but before rounding, as un-rounded coefficients (i.e., $D_{u,v}/q_{u,v}$). In addition, this description refers to the un-rounded coefficients after rounding as rounded coefficients, (i.e., $R_{u,v}$). In the final step, entropy encoding is used to losslessly encode the rounded coefficients.

The quantization steps may be specified in an 8×8 quantization table. Typically, increasing the quantization step produces smaller quantized coefficients, with more information lost during the quantization. A group of quantization matrices has been pre-defined, and used by many applications of JPEG. These quantization matrices may be arranged by an index called quality factor (QF), whose value ranges from 1 to 100. The quality factor QF controls the tradeoff between visual quality and the level of compression. For example, a QF=100 may correspond to the highest quality and the lowest compression ratio, and vice visa for QF=1.

Turning to YASS in more detail, the philosophy behind YASS is relatively simple yet effective. YASS does not embed data in JPEG coefficients directly. Instead, YASS uses a Quantization Index Modulation (QIM) embedding strategy to hide information in the quantized DCT coefficients of randomly chosen 8×8 host blocks, whose locations may not coincide with the 8×8 grids used in JPEG compression. After data embedding, images are compressed to JPEG format for distribution. A self-calibration process may include decompressing the input JPEG image into a spatial representation, cropping the first four (4) rows and the first four (4) columns of the image, and finally compressing the cropped image into JPEG format using the same quality factor as the input image. Such self-calibration processes may be used in steganalysis to estimate the statistics of a JPEG cover image from its stego version, may be disabled. In addition, to provide error-free extraction of the secret information 114, YASS may employ erasure and error correction codes to encode pure payload data before embedding. Compared to previous JPEG steganographic schemes, the embedding efficiency of YASS may be relatively low.

Although YASS purports to output stego-images in JPEG format, YASS does not directly modify the JPEG coefficients to carry data. Intuitively, it may be more efficient to extract steganalytic features from a domain where the steganography takes place. Hence, instead of attacking YASS from a JPEG domain (as do some previous JPEG steganalytic algorithms), the tools and techniques described herein attack YASS from the domain where YASS embeds data, as described in further detail below. Specifically, as described in further detail below, YASS may not completely randomize the locations in which host blocks are embedded, or may not randomize these locations enough.

In addition, the steganalytic techniques described herein may recognize that some locations in a suspect image may hold an entire embedding host block. However, these steganalytic techniques may also recognize that some locations in the suspect image are unlikely to hold embedding host blocks. Furthermore, as illustrated and discussed below in more detail, the QIM embedding strategy of YASS produces extra zero quantized DCT coefficients in embedding host blocks. As a result, the statistical features extracted from possible locations of embedding host blocks may be different from the statistical features extracted from unlikely locations of embedding host blocks. Based on these observations, the steganalytic systems 116 may implement steganalytic scheme to attack YASS, as well as other techniques for steganography.

Figure 2:
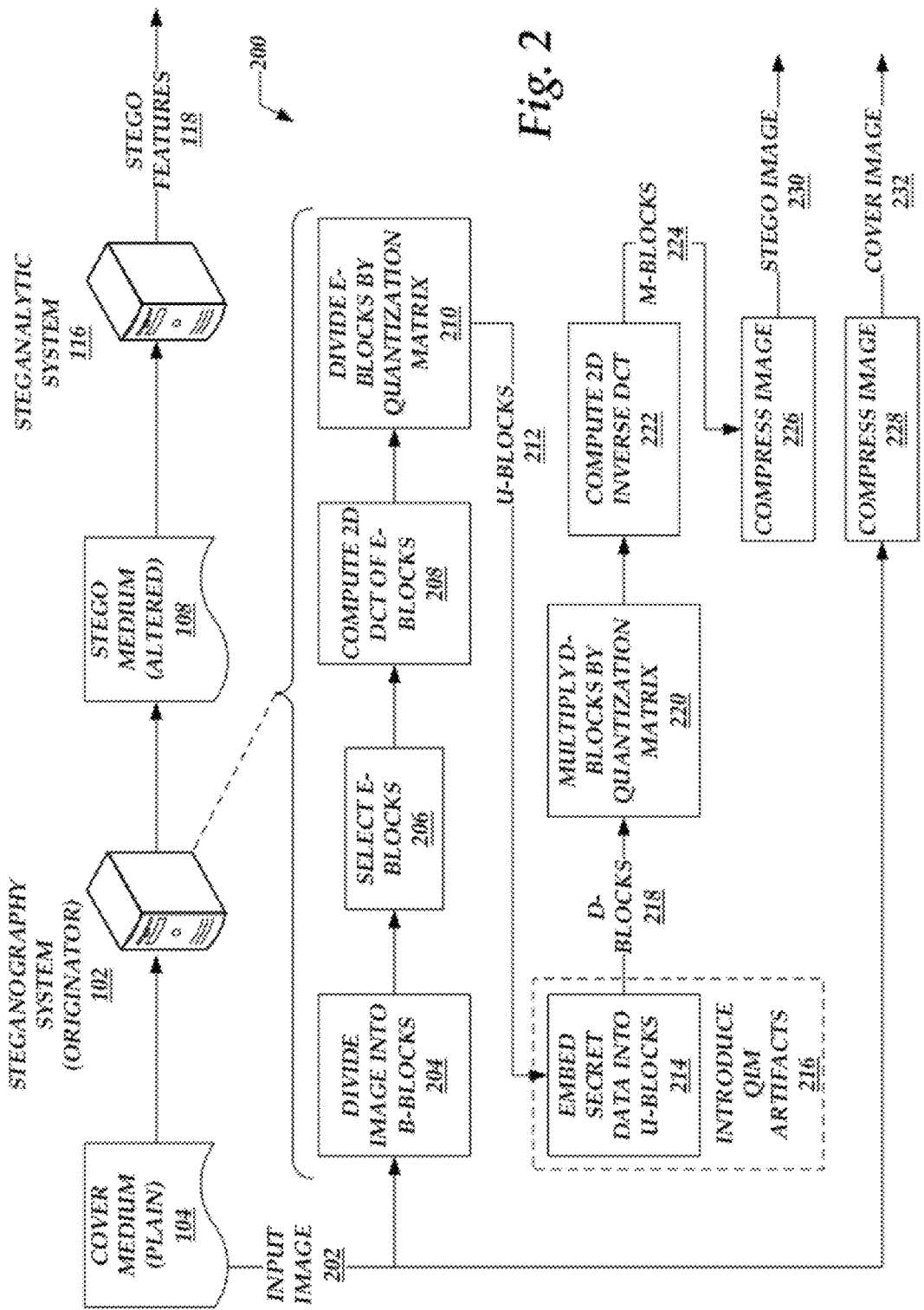
FIG. 2 is a block diagram illustrating example process operations for a process of an example implementation of a Yet Another Steganographic Scheme (YASS) that may produce stego-media analyzed by the steganalytic systems and techniques described herein.

FIG. 2 is a block diagram illustrating example process operations for a process, denoted generally as 200, of an example implementation of a YASS that may produce stego-media analyzed by the steganalytic systems and techniques described herein. For convenience of reference and illustration, but not to limit possible implementations, FIG. 2 carries forward examples of the cover medium 104, the originating steganography system 102, the stego-medium 108, the steganalytic system 116, and the extracted stego features 118.

As described above, non-limiting implementations of the cover medium 104 may include images (e.g., JPEG images). FIG. 2 denotes an example input JPEG image at 202. Given an input image 202 of size M×N, the embedding process of YASS may include the following processing.

Block 204 represents dividing the input image 202 into non-overlapping consecutive B×B (e.g., B>8) blocks. This description refers to these blocks as Big-blocks (or B-blocks) in the rest of this discussion.

As represented in block 206, within each B-block, a sub-block (e.g., an 8×8 block) is randomly selected by using a secret key only shared with a receiver (e.g., system 112 and FIG. 1). For convenience, this description refers to this type of sub-block as an Embedding-block (or E-block).

Block 208 represents computing two-dimensional (2-D) discrete cosine transforms (DCTs) for each E-block. In turn, block 210 represents dividing the DCT coefficients by quantization steps specified by a design quality factor $QF_h$, which may determine the quantization steps in the data embedding process performed by YASS. However, the value of the design quality factor $QF_h$ may or may not be the same as the advertised quality factor $QF_a$ referred to below. FIG. 2 denotes the output of block 210 as Un-rounded-blocks (or U-blocks) 212. Put differently, the U-blocks 212 may represent the E-blocks after the DCT coefficients for the E-blocks have been computed and divided by the quality factor $QF_h$.

Block 214 represents embedding secret data or information into the U-blocks 212. Block 214 may include using a QIM embedding scheme for hiding data in the coefficients in some predetermined low frequency alternating current (AC) DCT modes (also called candidate embedding bands) whose rounding values are non-zeros. In example implementations, un-rounded coefficients whose rounding values are zeros and un-rounded coefficients are not in the candidate embedding bands remained unaltered (i.e., are neither rounded nor used for embedding secret information). In this manner, QIM may minimize the risk of introducing visual artifacts and statistical artifacts, although QIM may introduce some artifacts that are represented generally at 216.

A U-block after the QIM embedding process may be denoted as a Data-embedded-block (or D-block) 218. Example implementations of YASS may select the first nineteen AC DCT modes in the zigzag order of the luminance channel as candidate embedding bands.

Block 220 represents multiplying the D-blocks 218 by the quantization matrix specified by the design quality factor $QF_h$. In turn, block 222 represents performing 2-D inverse DCT on the output of block 220. FIG. 2 denotes the blocks as output from block 222 as Modified-blocks (or M-blocks) 224.

Blocks 226 and 228 represent compressing the whole image to JPEG with an advertised quality factor $QF_a$, which refers to a quality factor associated with the JPEG image that may be made available to processes that analyze the JPEG image. This description refers to each block in the JPEG 8×8 grid as a JPEG-block (or J-block). Block 226 represents compressing the M-blocks 224 to result in a stego-image 230, while block 228 represents compressing the unaltered input image 202 to result in a cover image 232.

FIG. 2 illustrates procedures for creating a cover image 232 and its corresponding YASS stego-image 230. In the stego-image 230, the terms E-blocks, U-blocks, D-blocks, and M-blocks refer to the different stages of embedding host blocks, as performed by the YASS embedding process. In the cover image 232, the same terminology may apply to the E-blocks, U-blocks, D-blocks, and M-blocks, respectively. To minimize confusion, this description may refer to the coefficients after performing DCT as DCT coefficients. In addition, this description may refer to the DCT coefficients after division with quantization steps, but before rounding, as un-rounded quantized DCT coefficients (or un-rounded coefficients). Finally, this description may refer to the un-rounded coefficients after rounding as rounded quantized DCT coefficients (or rounded coefficients).

Referring to the recipient system (e.g., 112 in FIG. 1), the recipient system first decompresses the stego-medium 108 (or the stego-image 230) to the spatial domain. Afterwards, the recipient system 112 retrieves the M-blocks using the secret key exchanged with the originating steganography system 102. The recipient system 112 may then perform a 2-D DCT on the M-blocks, and quantize the resulting DCT coefficients by the quantization steps specified by $QF_h$. In turn, the resulting rounded coefficients as extracted from the candidate embedding bands are further processed to recover the embedded secret data or information (e.g., 114 FIG. 1).

The Embedding Payload

Since the last step of the YASS embedding process uses lossy JPEG compression, errors are inevitably introduced into the embedded data. To convey the secret data correctly, YASS implementations may be arranged to employ the technique of Repeat-Accumulate (RA) codes (one of the low complexity classes of Erasure and Error Correction codes), with a redundancy factor q, to encode pure payload bits before embedding. The data before and after RA encoding are respectively referred to as pure payload and RA payload in this description.

A recipient system (e.g., 112 in FIG. 1) may encounter rounded coefficients that appear in the candidate embedding bands. For those rounded coefficients having values of zero, the recipient system may not be able to determine whether these zero-value rounded coefficients result from the un-rounded coefficients in U-blocks whose rounding values are zeros, or whether these zero-value rounded coefficients result from the rounded coefficients in D-blocks that have been altered to zeros by QIM. Owing to the erasure recovery ability of RA codes, the recipient system need not know where or how the zero-value rounded coefficients obtained their values. In other words, if a given un-rounded coefficient has its value rounded to zero, then its corresponding to-be-embedded RA payload bit may be considered to be erased. This description refers to a QIM payload as the payload bits that are used for QIM embedding, with the exclusion of those erased RA payload bits.

Even though some RA data bits may be erased and some embedded QIM payload bits may suffer perturbations due to the JPEG compression, pure payload bits may be decoded by using a sum-product algorithm at the recipient system 112, when a redundancy factor q is selected appropriately. Within the sum-product algorithm, q is an integer ranging in value, for example, from 10 to 40. In some implementation scenarios, the redundancy factor q may be affected by the texture of a particular image, the secret key, the size B of the B-blocks, the design quality factor $QF_h$, and the level of the lossy JPEG compression $QF_a$.

Embedding Rates

Implementations of this description may use an embedding rate to quantify the payload that can be embedded into a cover image, expressed in terms of bits per non-zero AC DCT coefficients (bpnz). Denoting the embedding rate of the pure payload, RA payload, and QIM payload respectively by $P_{PURE}$, $P_{RA}$, and $P_{QIM}$, the embedding rate may be calculated by $P_{PURE}=P_{RA}/q$ and $P_{RA} \geq P_{QIM}$.

In addition, denoting the number of candidate embedding bands as $N_c$ and denoting the number of non-zero AC DCT coefficients in a cover image as $N_{nz}$, the maximum RA embedding rate can be computed as $\lfloor M/B \rfloor \times \lfloor N/B \rfloor \times N_c/N_{nz}$, where $\lfloor A \rfloor$ represents the operation of rounding a real number A (with A representing any of the quantities shown in this equation) to the nearest integer less than or equal to A. For example:

$\lfloor 1.3 \rfloor = 1$, $\lfloor -1.3 \rfloor = -2$, $\lfloor 2.7 \rfloor = 2$ In other words, when two stego-images are generated from the same input image, if they have the same $QF_a$ and the same B, whatever their $QF_h$'s are, these two stego-images would have the same maximum $P_{RA}$. Furthermore, if the two stego-images have different $QF_h$, they will have different $P_{PURE}$ since the redundant factors are different. The process for selecting a pair of $QF_a$ and $QF_h$ to optimize $P_{PURE}$ is non-trivial. The $P_{PURE}$ may be smaller for scenarios in which $QF_h > QF_a$, as compared to scenarios in which $QF_h \leq QF_a$, because the final JPEG compression at a small $QF_a$ will strongly disturb the embedded data when using a large $QF_h$. Therefore, a larger q may be employed, thereby reducing $P_{PURE}$. Empirically, $QF_h \leq QF_a$ holds to enhance the robustness of the embedded data and to provide a small q for a high $P_{PURE}$. Otherwise, $P_{PURE}$ may be relatively low, thereby reducing the attraction of YASS.

An Upper Bound of the QIM Payload Embedding Rate

An upper bound of $P_{QIM}$ may be derived for a given B as $64/B^2$ when $QF_h \leq QF_a$ holds. The derivation is as follows. Assume the average amount of the un-rounded coefficients that are available for QIM embedding (their rounding values are non-zeros) per U-block is $T_1$. Assume the average amount of non-zero JPEG AC DCT coefficients per J-block in a cover image is $T_2$. When $QF_h \leq QF_a$ holds, one should generally have $T_1 \leq T_2$, since a smaller quality factor reduces the number of non-zero coefficients. Then, the total amount of coefficients that are available for QIM embedding is $\lfloor M/B \rfloor \times \lfloor N/B \rfloor \times T_1$, and the total amount of non-zero AC DCT coefficients is $\lceil M/8 \rceil \times \lceil N/8 \rceil \times T_2$, where $\lceil A \rceil$ is the operation of rounding A to the nearest integer greater than or equal to A. As a result, an upper bound of $P_{QIM}$ in the sense of bpnz can be roughly computed as $$P_{QIM}(\text{upper}) = \frac{\lfloor M/B \rfloor \times \lfloor N/B \rfloor \times T_1}{\lceil M/8 \rceil \times \lceil N/8 \rceil \times T_2} \leq \frac{M \times N \times T_1/B^2}{M \times N \times T_2/8^2} \leq \frac{64}{B^2}$$

YASSv1 and YASSv2

The above examples of YASS may use one E-block in a B-block. This case may be denoted as YASSv1. In another case, denoted as YASSv2, more than one E-block may be used in a large B-block (e.g., B>16). YASSv2 may exploit more space for data hiding, but may be less secure than YASSv1.

Without limiting possible implementations, this description provides examples of attacking YASSv1. In this description, the block size B is assumed to have values less than 16, since $P_{PURE}$, $P_{RA}$, and $P_{QIM}$ generally become low as B>13 in YASSv1. However, implementations of this description may be extended to detect YASSv2. Only for the purposes of this description, but not to limit such implementations, the term YASS as used in this description may refer to YASSv1.

Detecting QIM Embedding Artifacts

QIM Embedding in YASS

QIM is a data-hiding scheme used in the covert communication community. In general, QIM may be utilized to quantize a host signal to a sequence of indices that are modulated by to-be-embedded data. The QIM embedding scheme employed by YASS uses two quantizers, i.e., an odd quantizer $Q_{odd}$ and an even quantizer $Q_{even}$, to embed binary payload data as follows:

$$y = Q_{even}(x, \Delta) = x + \Delta - \mathrm{mod}(x+\Delta, 2\Delta) \text{ if } m=0$$

$$y = Q_{odd}(x, \Delta) = x + \Delta - \mathrm{mod}(x, 2\Delta) \text{ if } m=1$$

where:

x and y respectively represent the value of a coefficient before and after embedding;

m is a binary bit in the payload bit-stream for embedding; and $\Delta$ is a quantization step size controlling the trade-off between the robustness of embedding and the distortions introduced by quantization.

Referring to the equations for the odd and even quantizers as defined in the previous paragraph, the mod(a,b) operation may compute the remainder after the division of a by b. In this way, a coefficient whose value is in the interval of $[(2k-1)\Delta, (2k+1)\Delta)$ may be quantized to a reconstruction point $2k\Delta$ if an even quantizer is used, whereas a coefficient whose value is in the interval of $[2k\Delta, (2k+2)\Delta)$ may be quantized to a reconstruction point $(2k+1)\Delta$ if an odd quantizer is used, where k denotes an integer. In addition, YASS leaves unaltered in U-blocks those un-rounded coefficients whose rounding values are zeros.

Figure 3:
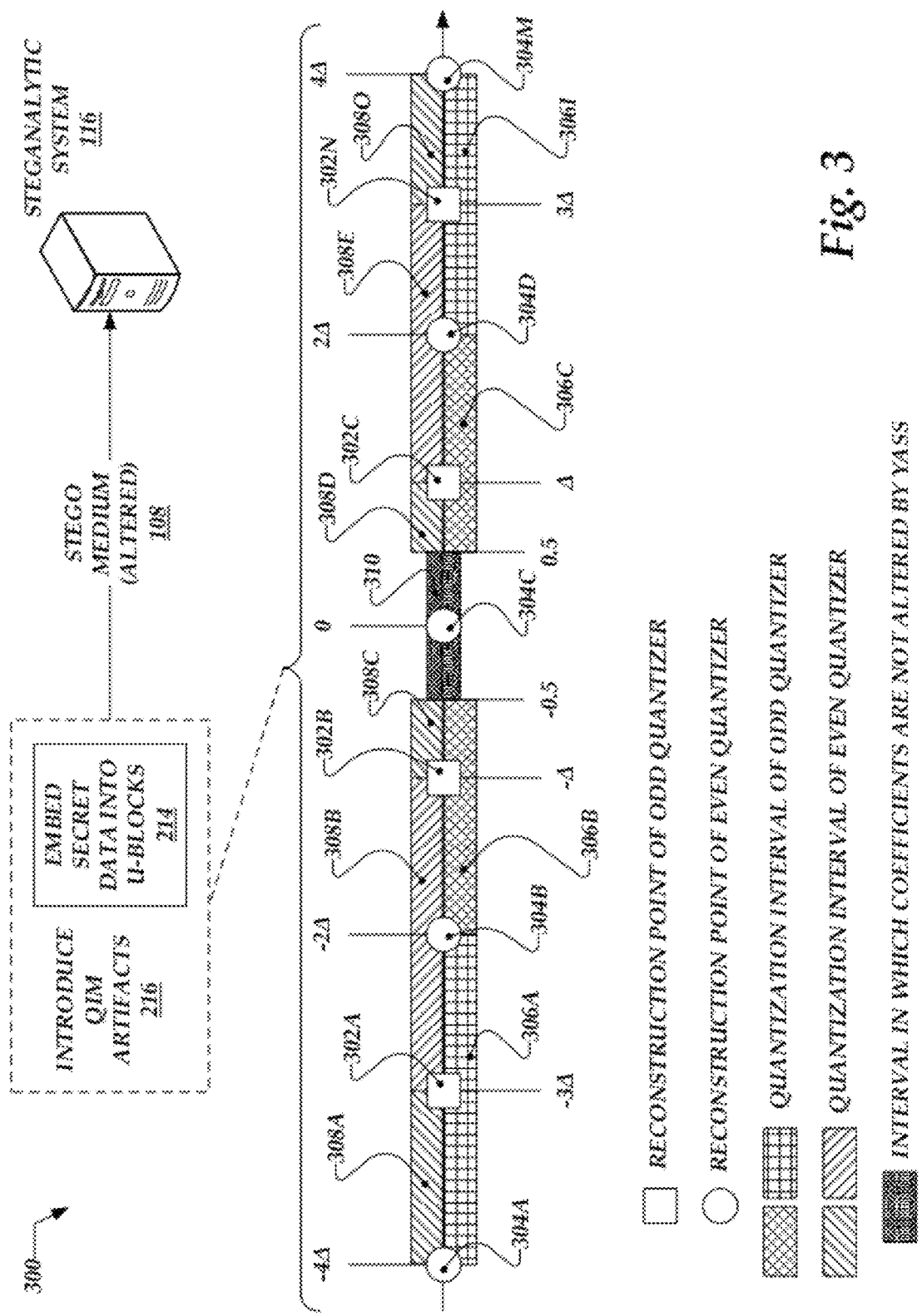
FIG. 3 is a diagram illustrating example Quantization Index Modulation (QIM) quantization intervals and QIM reconstruction points employed by YASS.

FIG. 3 is a diagram illustrating example Quantization Index Modulation (QIM) quantization intervals and QIM reconstruction points employed by YASS, as denoted generally at 300, in accordance with the present disclosure. Without limiting possible implementations, FIG. 3 may be understood as elaborating further on blocks 214 and 216 shown in the example YASS implementations shown in FIG. 2. In addition, the stego-medium 108 and steganalytic system 116 are carried forward from previous Figures to provide operational context.

Turning to FIG. 3 in more detail, FIG. 3 illustrates example reconstruction points of the odd quantizer at 302a, 302b, 302c, and 302n (collectively, reconstruction points 302). FIG. 3 also illustrates reconstruction points of the even quantizer at 304a, 304b, 304c, 304d, and 304m (collectively, reconstruction points 304). In addition, FIG. 3 illustrates quantization intervals of the odd quantizer at 306a, 306b, 306c, and 306i (collectively, quantization intervals 306), and illustrates quantization intervals of the even quantizer at 308a, 308b, 308c, 308d, 308e, and 308o (collectively, quantization intervals 308). FIG. 3 also denotes at 310 an interval in which coefficients are not altered by YASS.

Observing QIM Embedding Artifacts by JPEG Re-Quantization

As illustrated in FIG. 1, the cause QIM modifies the un-rounded coefficients during YASS embedding, artifacts may be introduced into U-blocks, and these artifacts may remain in the stego-image. This description refers to such artifacts as QIM embedding artifacts. This description provides techniques for observing the traces of these QIM embedding artifacts, as now discussed.

For the purposes of describing an example, assume that all M-blocks from a stego-image and all corresponding M-blocks from a corresponding cover image may be collected. These M-blocks may be quantized using use a JPEG quantizer at $QF_h$ (i.e., performing 2-D DCT on the M-blocks, dividing the resulting DCT coefficients by quantization steps specified by $QF_h$, and finally rounding the resultant un-rounded coefficients). This description refers to such a process as JPEG re-quantization, and refers to the coefficients before and after rounding as un-rounded re-quantized DCT coefficients and rounded re-quantized DCT coefficients, respectively. Note that the term "re-quantized" used here reflects the nature of the steganalytic process.

Figure 4:
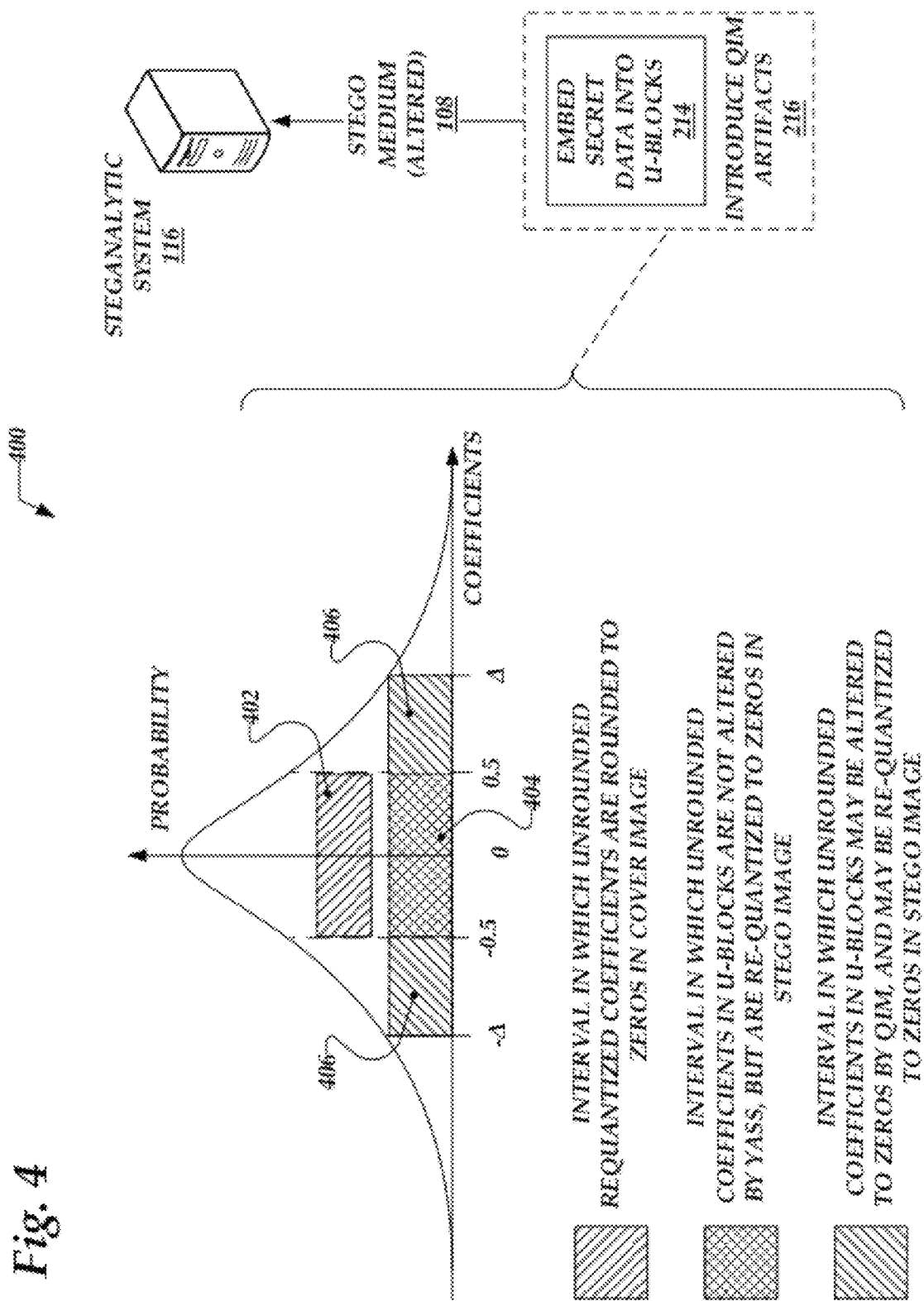
FIG. 4 is a diagram illustrating how unrounded coefficients for a stego-image and a cover image are handled over different intervals.

FIG. 4 is a diagram illustrating, as denoted generally at 400, how coefficients of a cover image are handled over different intervals in accordance with the present disclosure. More specifically, over an interval 402 unrounded re-quantized coefficients may be rounded to zeros in the cover image. Over an interval 404, unrounded coefficients in U-blocks may not be altered by YASS, but may be re-quantized to zeros in a stego-image. Over an interval 406, unrounded coefficients in the U-blocks may be changed to zeros by QIM and may be re-quantized to zeros in a stego-image. To provide illustrative but non-limiting context, FIG. 4 carries forward blocks 214 and 216 from FIG. 2 representing the QIM assessing, as well as the example stego-medium 108 and the steganalytic system 116.

Comparing candidate embedding bands in a stego-image with its corresponding cover image, the stego-image is expected to contain more rounded re-quantized DCT coefficients having zero values than the corresponding cover image. Within the cover image, the rounded re-quantized DCT coefficients having values of zero may be generated from the un-rounded re-quantized DCT coefficients whose values are in the interval of [−0.5, 0.5). Meanwhile, as illustrated in FIGS. 3 and 4, the QIM embedding scheme used in YASS may not alter the un-rounded coefficients in U-blocks whose values are in the interval of [−0.5, 0.5). If these un-rounded coefficients were rounded in the JPEG re-quantization, they would become zeros.

In addition, the un-rounded coefficients in U-blocks originally in the interval of [−Δ, −0.5) and [0.5, Δ) may be quantized to zeros by QIM embedding. The possibility of this occurring is close to 50% if binary "0s" and "1s" are uniformly distributed in the payload bit-stream. The coefficients that have been quantized to zeros by QIM are still re-quantized to zeros in the JPEG re-quantization. As the Δ-values as shown in FIGS. 3 and 4 become larger, the embedding becomes more robust. In addition, extra rounded re-quantized coefficients having zero values can be observed. Specifically, the value of Δ in illustrative YASS implementations may be set to 1. We define the frequency of zero rounded re-quantized DCT coefficients as the ratio of zero rounded re-quantized DCT coefficients in the candidate embedding bands, relative to the total number of rounded re-quantized DCT coefficients in the candidate embedding bands. Therefore, it is expected that the frequency of zero rounded re-quantized DCT coefficients may be larger in a stego-image, as compared to its corresponding cover image.

Figure 5:
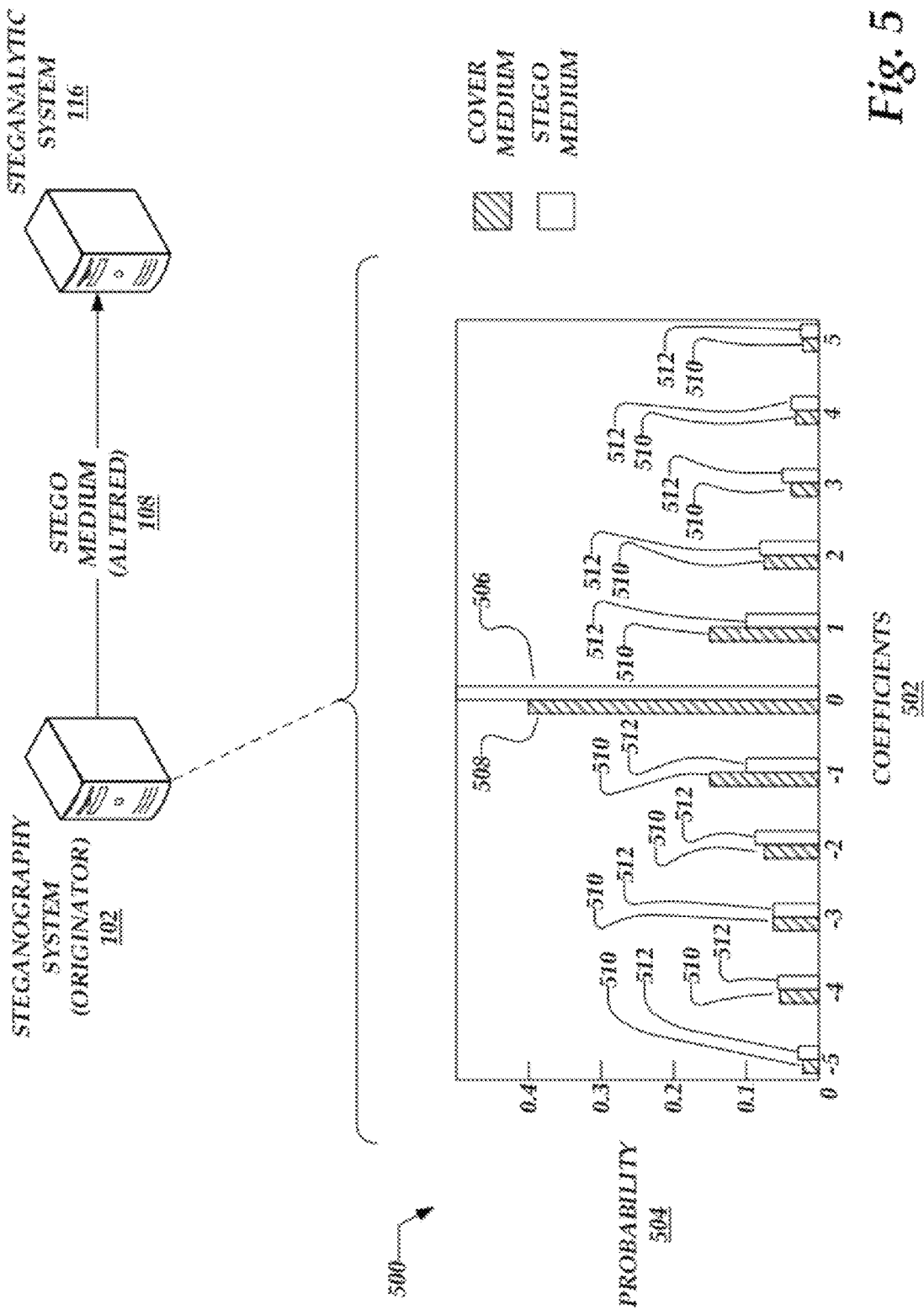
FIGS. 5 and 6 are diagrams that illustrate histogram distributions of the rounded re-quantized DCT coefficients of M-blocks from candidate embedding bands of a stego-image.
Figure 6:
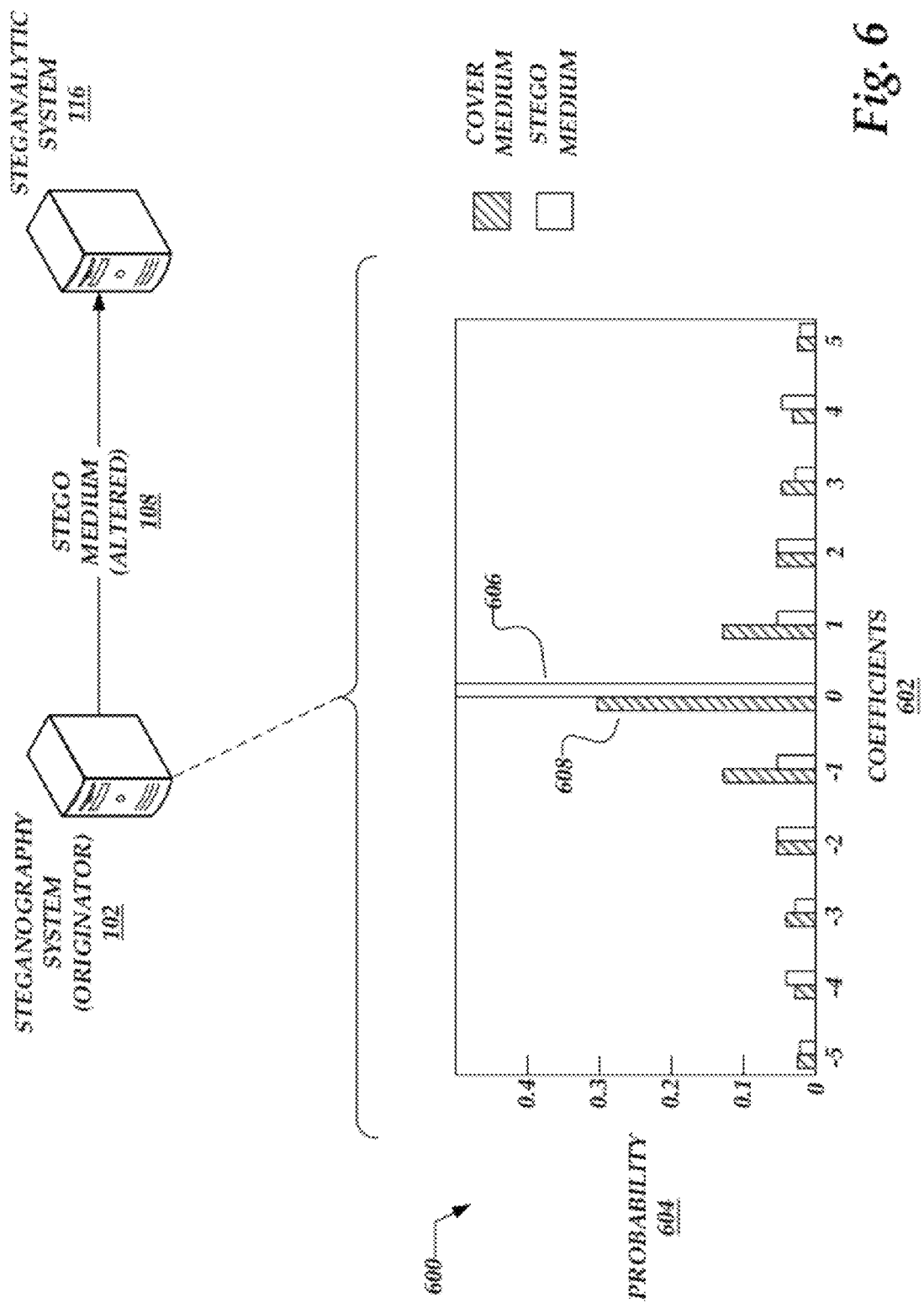

FIGS. 5 and 6 are diagrams that illustrate histogram distributions, denoted respectively at 500 and 600, of the rounded re-quantized DCT coefficients of M-blocks from candidate embedding bands of a stego-image (e.g., $QF_h$=50, $QF_a$=75, B=9) in accordance with the present disclosure. FIGS. 5 and 6 also illustrate comparable statistics from the cover image that corresponds to the stego-image. In FIG. 5, the quality factor in re-quantization may be set to 50, while in FIG. 6 the quality factor in re-quantization may be set to 75. To provide context, but not to limit possible implementations, FIGS. 5 and 6 carry forward an example steganography system at 102, an example stego-medium at 108, and an example steganalytic system 116.

In both FIGS. 5 and 6, example values of the rounded re-quantized DCT coefficients are arranged along the horizontal axes 502 and 602 of the histograms. The probabilities of those coefficient values occurring within a cover medium and within a stego medium are presented along the vertical axes 504 and 604. More specifically, FIGS. 5 and 6 present data related to the stego-medium in the shaded bars, and present data related to the cover medium in the non-shaded bars.

Although these shaded and non-shaded bars are approximate and not drawn to scale, for the non-zero coefficient values, the statistics for the stego-medium and the cover medium are comparable. However, referring to the zero-value coefficients as shown in FIGS. 5 and 6, the stego-medium contains considerably more zero-valued coefficients, as compared to the cover medium, for both quality factors. For example, in FIG. 5, comparing the non-shaded bar 506 to the shaded bar 508, the non-shaded bar 506 indicates that rounded re-quantized DCT coefficients having values of zero are much more prevalent in the stego-medium, relative to the cover medium represented by the shaded bar 508. Likewise, in FIG. 6, comparing the non-shaded bar 606 to the shaded bar 608 indicates that the stego-medium includes considerably more instances of the rounded re-quantized DCT coefficients having values of zero, relative to the cover medium.

Referring in more detail to the statistical profile shown in FIG. 5, the different shaded bars 510 represent how many rounded re-quantized DCT coefficients in the cover medium have values of −5, −4, −3, −2, −1, 1, 2, 3, 4, and 5. Similarly, the different shaded bars 512 represent how many rounded re-quantized DCT coefficients in the stego-medium have these same values. For the coefficient values −5, −4, −3, −2, −1, 1, 2, 3, 4, and 5, the statistics for the cover medium and the stego-medium are generally similar. In some cases, for example at coefficient values of −1 or +1, the cover medium may contain slightly more occurrences of these values than the stego-medium. In other cases, for example at coefficient values of 1 through 5, the stego-medium may contain slightly more occurrences of these values than the cover medium. However, for coefficient values of zero, the stego-medium exhibits a spike in occurrences, as compared to the cover medium.

Observations similar to those described in FIG. 5 generally apply to the statistical profile shown in FIG. 6. For example, for the rounded re-quantized DCT coefficient values −5, −4, −3, −2, 2, 3, 4, and 5, the statistics for the cover medium and the stego-medium are generally comparable. For coefficient values of −1 or 1, the cover medium may contain slightly more occurrences of these values than the stego-medium. However, for coefficient values of zero, the stego-medium exhibits a spike in occurrences, as compared to the cover medium.

As appreciated from the statistical profiles represented in FIGS. 5 and 6, a stego-medium may exhibit certain statistical anomalies, as compared to a cover medium. More specifically, examples of these statistical anomalies may include the spike in rounded re-quantized DCT coefficients that have values of zero. These extra zero-rounded re-quantized DCT coefficients can be regarded as a part of the QIM embedding artifacts (e.g., as shown at 216 in FIGS. 2-4), and the abnormally increasing number of zero-rounded re-quantized DCT coefficients may provide an indication of QIM embedding, which may expose the application of steganographic techniques (e.g., YASS).

The steganalysis processes described below in FIGS. 7-11 may capitalize on these statistical anomalies to classify suspect media as altered stego-media or as unaltered media. However, in implementations of these steganalysis processes, a cover medium may not be available for comparison to the suspect media. However, the YASS techniques referred to herein may alter certain eligible locations of a cover medium to embed the stego-data. Other locations within the cover medium are unlikely or ineligible for embedding stego-data. The steganalysis processes detailed further below may compare the statistical profiles of the eligible locations and the ineligible locations. If statistical anomalies similar to those shown in FIGS. 5 and 6 occur in the eligible locations, then these anomalies may suggest that the suspect medium is a stego-medium.

Considerations for Implementations

For several different reasons, it may be difficult to collect M-blocks for JPEG re-quantization from a stego-image, as mentioned before. First, a warden (e.g., steganalytic system 116) may not be able to access the exact locations of the M-blocks without having access to the key that was exchanged between the originating steganography system 102 and the recipient system 112. Second, the warden may not know the exact value of $QF_h$. Third, the statistics of the M-blocks may change after a JPEG compression at $QF_a$ is performed in the last step of YASS embedding.

The tools and techniques described herein may overcome these obstacles to some extent, due to some constraints in YASS. First, although the locations of embedding host blocks (M-blocks) are randomly chosen within B-blocks, these embedding host blocks may occur in some portions the entire image. More specifically, the locations of these M-blocks may be constrained to be within B-blocks. Hence, given an image, the steganalytic techniques described herein may identify locations within the image where M-blocks may occur, and may identify locations within the image where M-blocks are unlikely to occur.

Second, there may be a constraint that $QF_h \leq QF_a$ to provide a reasonable $P_{PURE}$. If a JPEG quantizer is used at $QF_a$ to replace a JPEG quantizer at $QF_h$ for JPEG re-quantization, one would still expect to have more zero rounded re-quantized DCT coefficients in a stego-image, as compared to a corresponding cover image.

Third, still owing to the constraint of $QF_h \leq QF_a$, the statistics of coefficients in M-blocks should not be deviated much after the JPEG compression at $QF_a$ is performed, especially the amount of and the locations of zero-rounded coefficients. For example, after using $QF_h$=50, $QF_a$=75, and B=9 to generate a stego-image and its corresponding cover image, all M-blocks are collected and JPEG re-quantization is performed at $QF_a$. As shown in FIG. 6, the frequency of zero-rounded re-quantized DCT coefficients in the stego-image may still be larger than that in its cover image.

Analyzing Locations of Embedding Host Blocks

Figure 7:
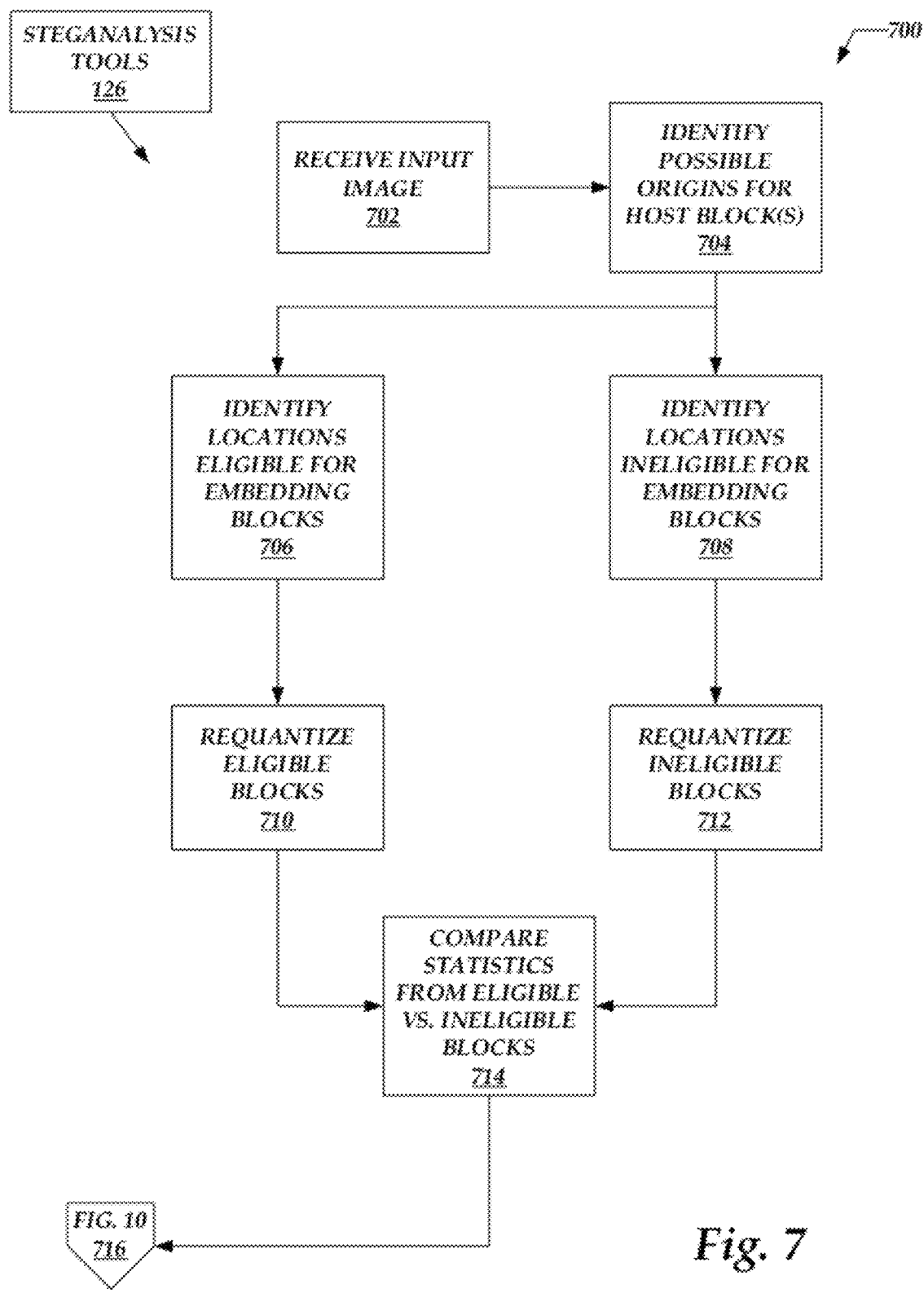
FIG. 7 is a flow diagram illustrating example process operations for a process to characterize suspect media (e.g., images) as stego-media or unaltered media.

FIG. 7 is a flow diagram illustrating example process operations for a process, denoted generally as 700, for characterizing suspect media (e.g., images) as stego-media or unaltered media, in accordance with the present disclosure. For purposes of this description, but not to limit possible implementations, the process operations 700 are described in connection with the steganalysis tools 126. However, it is noted that at least portions of the process operations 700 may be performed with other components without departing from the scope and spirit of the present description.

Block 702 represents receiving given suspect media as input. As described above, examples of suspect media may include, but are not limited to, JPEG images.

Figure 8:
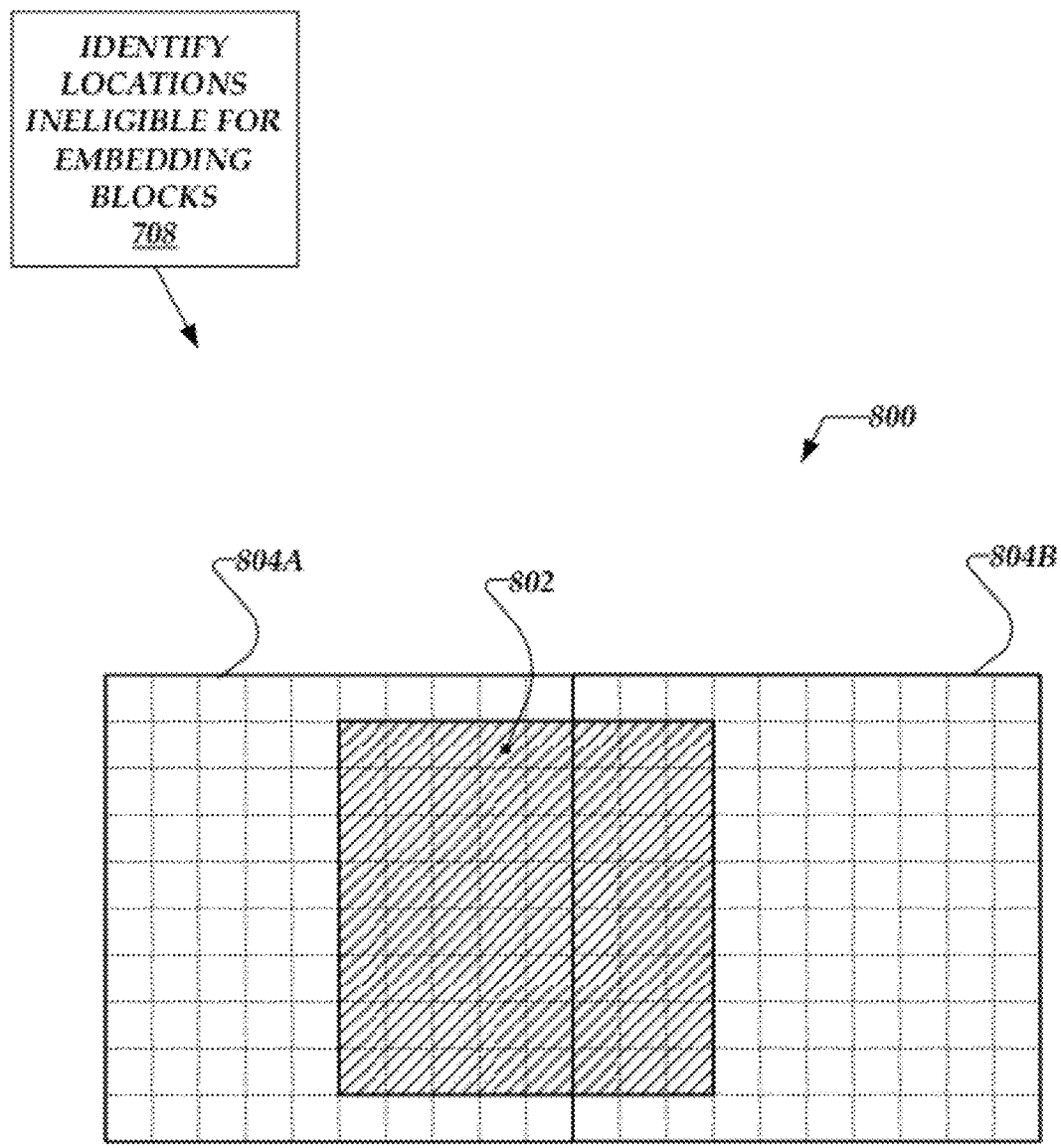
FIG. 8 is a diagram illustrating examples of ineligible locations for an embedding host block.
Figure 9:
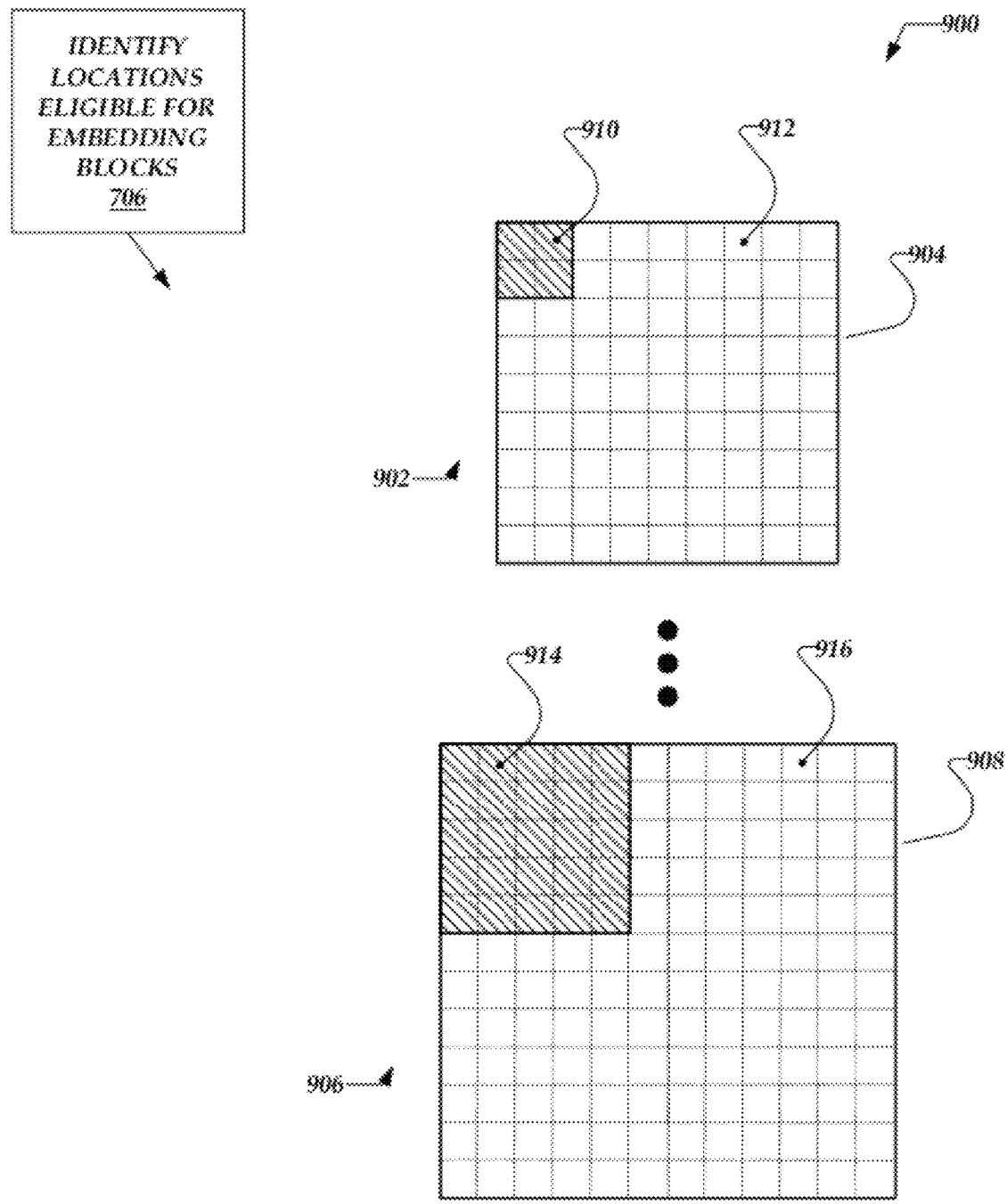
FIG. 9 is a diagram illustrating examples of eligible and ineligible origin positions for an 8×8 embedding host block.

Block 704 represents identifying possible origins for embedding host blocks within the input suspect media. In some implementations of YASS, as well as other steganography techniques, the locations of 8×8 embedding host blocks may not be randomized completely, or may not occur and all possible locations within the entire host image. In other words, YASS (and other steganography techniques) may regard some locations as eligible for embedding host blocks, and may regard other locations as ineligible for embedding host blocks. FIGS. 8 and 9 below elaborate further on ineligible and eligible blocks. However, in the overview presented in FIG. 7, block 706 represents identifying locations eligible for containing embedding blocks, while block 708 represents identifying locations ineligible or unlikely to contain embedding blocks.

As discussed above, more zero-rounded re-quantized DCT coefficients are expected to appear in the blocks that have undergone QIM embedding. Consequently, in FIG. 7, block 710 represents re-quantizing 8×8 blocks that are collected from possible or eligible locations for embedding host blocks. Block 712 represents re-quantizing blocks that are collected from ineligible locations for embedding host blocks. In turn, block 714 represents comparing the statistics that result from re-quantizing the eligible and the ineligible blocks. Without limiting possible implementations, and only for convenience and clarity of description, the discussion of the process flows 700 proceeds to FIG. 10, as indicated by the off-page reference 716.

Eligible and Ineligible Locations for Embedding Host Blocks

Figure 10:
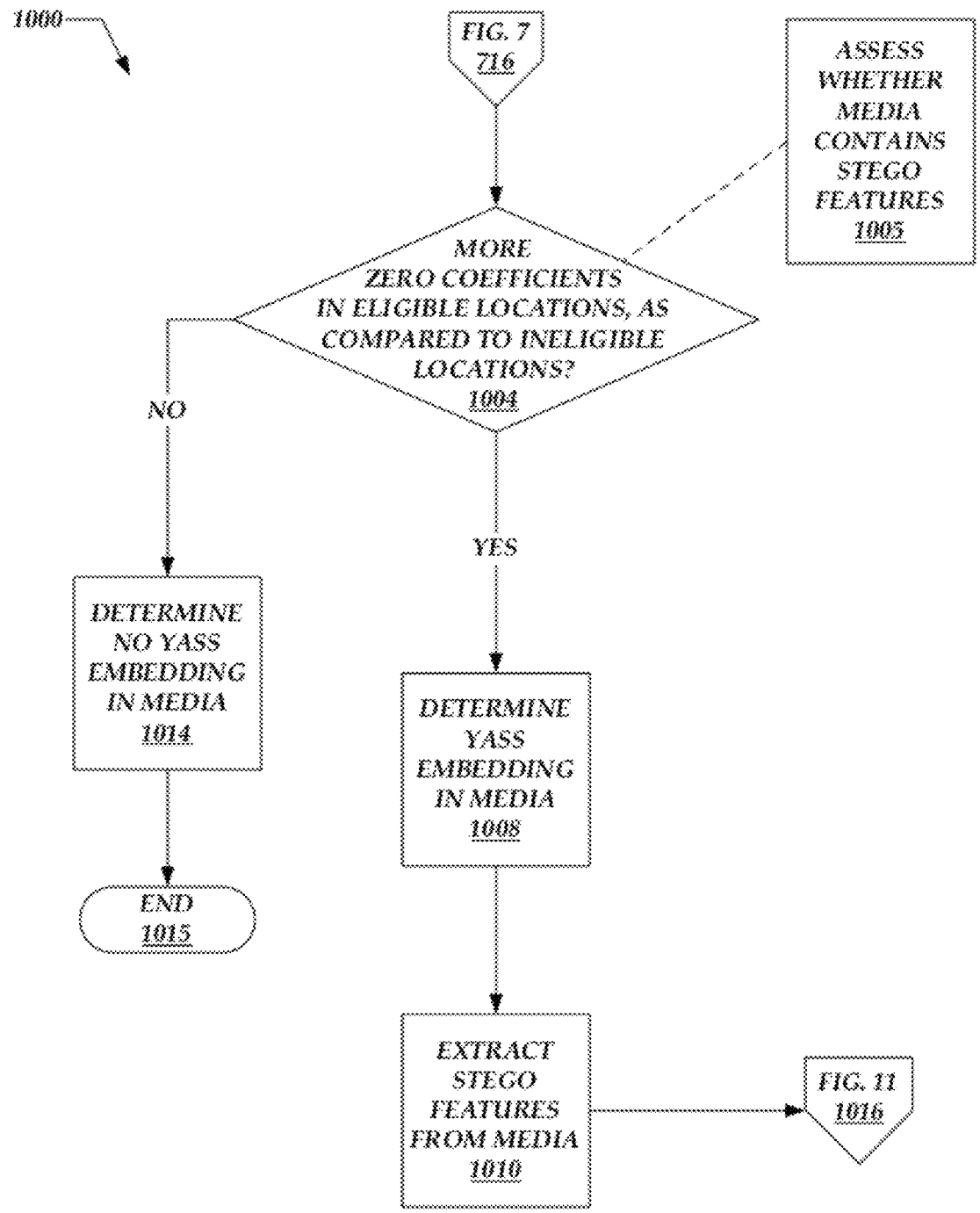
FIG. 10 is a flow diagram illustrating additional aspects of the example process from FIG. 7.

Before continuing the description of the processes with FIG. 10, the discussion elaborates further on processing represented in blocks 708 and 706. More specifically, block 708 will be further understood in connection with FIG. 8, and block 706 will be further understood in connection with FIG. 9.

FIG. 8 is a diagram illustrating examples of ineligible locations for an embedding host block. Without limiting possible implementations, FIG. 8 may be understood as elaborating further on block 708 in FIG. 7.

In more detail, FIG. 8 illustrates examples, denoted generally at 800, of ineligible locations for an embedding host block 802 in accordance with the present disclosure. As described above, embedding host blocks (M-blocks) may be constrained to reside inside B-blocks. Put differently, in some implementation scenarios, the embedding host blocks are not located within two or more B-blocks, and do not overlap multiple B-blocks. FIG. 8 illustrates an invalid scenario including two adjacent B-blocks 804a and 804b, with the embedding host block 802 overlapping or crossing the boundary between the B-blocks 804a and 804b. Thus, block 708 may include recognizing invalid scenarios in which proposed locations for the M-blocks would cross boundaries between adjacent B-blocks, as well as recognizing other invalid scenarios.

FIG. 9 is a diagram illustrating examples of eligible and ineligible origin positions for an 8×8 embedding host block. Without limiting possible implementations, FIG. 9 may be understood as elaborating further on block 706 in FIG. 7.

In more detail, FIG. 9 illustrates examples, denoted generally at 900, of eligible and ineligible origin positions for an 8×8 embedding host block in accordance with the present disclosure. FIG. 9 illustrates at 902 fitting a 8×8 embedding host block into a 9×9 B-block 904, and illustrates at 906 fitting the 8×8 embedding host block into a 12×12 B-block 908. For the purposes of this discussion, the origin of embedding host block may be defined as the element in the upper-left corner of the block. With this convention in mind, referring to 902 in FIG. 9, eligible origin positions for the 8×8 embedding host block may be represented by shaded squares 910, while ineligible origin positions may be shown by blank squares 912. Referring to 906, eligible origin positions for the 8×8 embedding host block may be represented by shaded squares 914, and ineligible origin positions may be shown by blank squares 916.

Generalizing from the foregoing examples, in a B×B block, there are $(B-8+1)^2$ different ways for locating an 8×8 embedding host block. So $(B-8+1)\times(B-8+1)$ elements on the upper-left of a B×B block are eligible locations for the origin of the 8×8 embedding host block, and the other $B^2-(B--8+1)^2$ elements in a B×B block are ineligible locations for the origin.

Once the B×B grid is resynchronized (i.e., the B×B grids as used by an originator of image data and an attacker of the image data become overlapped), ineligible locations for the embedding host blocks may be identified as described above. Further, eligible locations of an embedding host block may be identified with a probability of $1/(B-8+1)^2$. In addition, the size of a B-block and the origins of B-blocks are not key-dependent in YASS. Even though the origins of the B-blocks may not be known beforehand, since B-blocks are consecutive and non-overlapping, the B×B grid may be resynchronized within a search time of $B^2$. Hence, this discussion proceeds under the assumption that the B-blocks have already been synchronized.

FIG. 10 is a flow diagram illustrating additional aspects of the example process 700 from FIG. 7, with that portion shown in FIG. 10 denoted as process operations or process 1000. In a stego-image, more zero-rounded DCT coefficients are expected to result from re-quantizing the locations that are eligible for hosting blocks, as compared to re-quantizing the locations that are ineligible for hosting blocks. However, this phenomenon is not expected to occur in a cover image. In this way, traces of YASS embedding can be exposed, and cover images can be differentiated from stego-images based on such statistical comparisons.

Processing from 716 in FIG. 7 continues at block 1004. Block 1004 represents a decision block evaluating whether the re-quantizing processes performed in blocks 710 and 712 resulted in more zero-rounded DCT coefficients in the eligible locations, as compared to the ineligible locations. Put differently, block 1004 may represent assessing algorithmically whether a given instance of suspect media contains stego features, based on the foregoing statistical profiles and characteristics. FIG. 10 represents this assessment at block 1005.

If more zero-rounded DCT coefficients are identified at block 1004, then the process may continue from block 1004 to block 1008, which represents determining that the suspect media is most likely stego-media that has been embedded with secret information using YASS or other steganographic techniques. Processing continues from block 1008 to block 1010, which represents extracting stego features from the suspect media, as described shortly in more detail with FIG. 11.

Returning to block 1004, if the statistical profiles of the eligible and ineligible locations, as reflected by the number of zero-rounded DCT coefficients resulting from re-quantizing these locations, are similar, then the process may continue from block 1004 to block 1014. Block 1014 represents determining that the suspect media is most likely plain or cover media that is not been embedded with secret information. After performing block 1014, the process may terminate at block 1015. However, it is noted that the process shown in FIGS. 7-10 may be performed any number of times to analyze different instances of suspect media, and not all iterations of the process may end at block 1015.

The above analysis relies on an assumption that the size B of the B-block is known. This assumption may be reasonable, since B may not be a key-dependent parameter and can be deemed as a part of the algorithm of YASS, which is publicly available to a warden (e.g., the steganalytic system 116). In some practical implementations of steganalysis, however, a warden may not know the size parameter B. Nevertheless, implementations of the steganalytic system 116 may be able to identify some cases of B, especially when B may not be large. More specifically, example implementations of the steganalytic system may detect values of B≦15, because $P_{PURE}$ becomes rather low as B>13.

Some implementations of the steganalytic system may operate when B is a known value that is within the range (9≦B≦15), while other implementations may operate when B is an unknown value that is within the range (9≦B≦13). The discussion now proceeds to a description of to extracting steganalytic features in cases where a given instance of suspect media is determined to be stego-media. This description is now provided with FIG. 11. Without limiting possible implementations, and only for clarity of illustration, the discussion proceeds from FIG. 10 to FIG. 11 via off-page reference 1016.

Steganalytic Features

Figure 11:
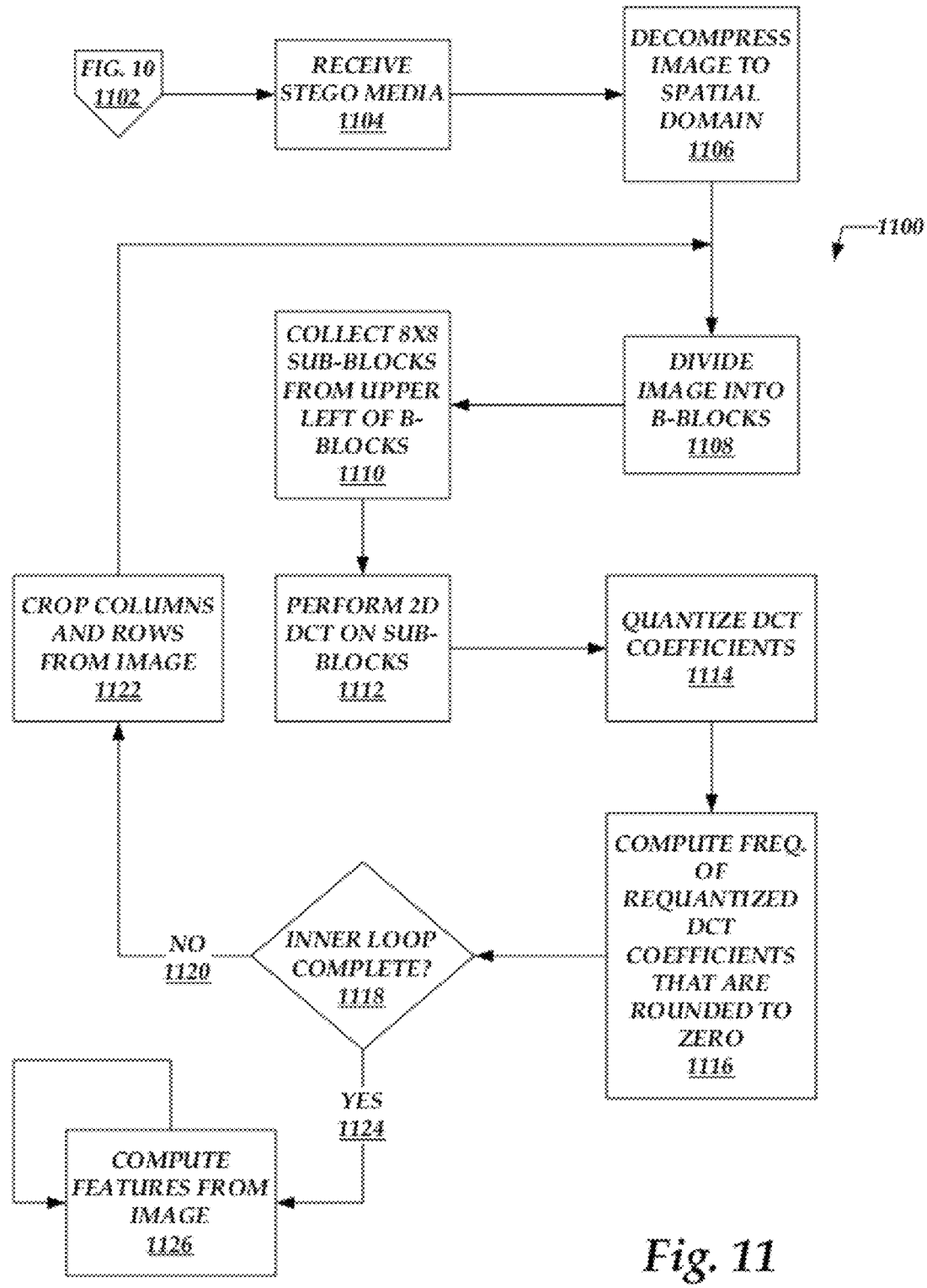
FIG. 11 is a flow diagram illustrating example process operations for a process for extracting steganalytic features from stego-media.

FIG. 11 is a flow diagram illustrating example process operations for a process, denoted generally at 1100, for extracting steganalytic features from stego-media. For convenience only, the description of FIG. 11 begins at off-page reference 1016 from FIG. 10.

An illustrative algorithm, presented in pseudo-code form, for extracting the stego features from the input media follows:

Given an input JPEG image under scrutiny, decompress it to spatial domain and denote the spatial representation by $I_1$. Perform the following loops:

in more detail, block 1104 may represent receiving stego-media (e.g., a stego JPEG file). For example, if the input stego-media is a JPEG image under scrutiny, block 1106 may represent decompressing the JPEG image to a spatial domain or representation. For convenience, this description denotes the spatial representation by $I_1$.

Processing continues from block 1106 to block 1108, which represents dividing the input image into a plurality of non-overlapping consecutive T×T B-blocks. Processing continues from block 1108 to block 1110, which represents selecting the 8×8 blocks from the upper left (i.e., the origin) of all the B-blocks. Processing may then continue from block 1110 to block 1112, which represents performing a 2-D DCT on the B-blocks. Processing may continue from block 1112 to block 1114, which represents quantizing the DCT coefficients. More specifically, block 1114 may include dividing the DCT coefficients by quantization factors specified by $QF_a$, and then rounding the resulting coefficients.

Processing may flow to block 1116, which represents computing the frequency of zero-rounded re-quantized DCT coefficients in the candidate embedding bands. As noted above, this frequency may be denoted by $Z_T(s)$. After block 1116, processing may continue to block 1118.

Block 1118 may represent evaluating whether the inner loop is complete. The inner loop refers to the processing loop that is regulated by the loop index s, as distinguished from the outer loop that is related by the loop index T. If the inner loop is not complete, the process 1100 may continue from block 1118 to block 1122, which may represent cropping the first s columns and the first s rows of $I_1$ to generate a new image $I_{s+1}$ for the next iteration of the inner loop. Afterwards, the process 1100 may return from block 1122 to block 1108, thereby repeating blocks 1108-1118 with the newly-cropped image.

Returning to block 1118, once the inner loop is complete, the process 1100 may flow to block 1126, which may represent computing values of the stego features.

The feature extraction process obtains a group of frequencies of zero-rounded re-quantized DCT coefficients, denoted by $Z_T(s)$, where T∈{9, 10, ..., 15} and s∈{1, 2, ..., T}. It is expected that $Z_T(i) > Z_T(j)$ (T∈{9, 10, ..., 15}, i∈{1, 2, ..., (T−7)}, j∈{(T−6), (T−5), ..., T}) when T=B in a stego-image

---

```
FOR T = 9 to 15
    FOR s = 1 to T
        Divide I_s into non-overlapping consecutive T × T B-blocks;
        Collect 8 × 8 blocks from the upper left of all B-blocks and perform 2-D DCT;
        Quantize the DCT coefficients, i.e., divide the DCT coefficients by quantization steps
            specified by QF_a and then round the resulting coefficients;
        Compute the frequency of zero rounded re-quantized DCT coefficients in candidate
            embedding bands and denote it by Z_T(s);
        Crop the first s columns and the first s rows of I_1 to generate a new image I_{s+1} for the next
            inner-loop;
    END
```

Compute the values of $\frac{1}{T-7}\sum_{i=1}^{T-7} Z_T(i)$ and $\frac{1}{7}\sum_{j=T-6}^{T} Z_T(j)$ as features.

END

---

The process 1100 shown in FIG. 11 presents the foregoing algorithm in flowchart form. Turning now to the process 1100 whose B-block size is B (i.e., more zero-rounded re-quantized DCT coefficients are generated from the eligible locations of embedding host blocks, as compared to the ineligible locations of embedding host blocks). Since the relation of $Z_T(i) > Z_T(j)$ ($T \in \{9, 10, \ldots, 15\}, i \in \{1, 2, \ldots, (T-7)\}, j \in \{(T-6), (T-5), \ldots, T\}$) is expected to be held in a stego-image, the relation of $$\frac{1}{T-7}\sum_{i=1}^{T-7} Z_T(i) > \frac{1}{7}\sum_{j=T-6}^{T} Z_T(j)$$

is also expected to be true.

Steganalytic Classifiers

Recalling previous description, the parameter B may represent the size of blocks processed within cover images. If the parameter B is known, a two-class supervised learning algorithm can be used to distinguish stego-images having a specific B from cover images. Example implementations may employ a Fisher Linear Discriminant (FLD) classifier to perform two-class classification analysis. Other implementations may use other supervised learning algorithms, such as Support Vector Machine. The FLD classifier may first be trained using feature vectors extracted from cover images, and then using stego-images with a specific value of B. Afterwards, the obtained classifier may be used to classify new cover images and new stego-images having this specific value of B.

When the value of B is unavailable to a warden (e.g., the steganalytic system 116 in FIG. 1), the steganalytic system may use a "one-against-one" multi-class classification strategy instead. In this "one-against-one" approach, the steganalytic system may construct $N*(N-1)/2$ two-class FLD classifiers for a total number of N classes. In these scenarios, the steganalytic system may regard cover images as a class with B=0, and may regard stego-images with different values of B as different classes. Each two-class classifier may be trained using two classes, and afterwards it may discriminate between these two classes. A feature vector, extracted from the testing image, may be assigned to a target class using each classifier in turn and a majority vote is taken. The maximum voted class may be selected as the target class for the testing image. In providing this example, however, it is noted that other multi-class classification strategies and multi-class classifiers may also be used in different implementations.

Influence of Embedding Parameters

The embedding parameters (i.e., the B-block size B, the design quality factor $QF_h$, and the advertised quality factor $QF_a$) may influence the performance of the steganalytic techniques described herein. For example, as the value of B increases, the embedding rate decreases, and the statistical difference between cover images and stego-images may reduce. Consequently, the smaller that B is, the easier it may be to detect stego-images. The difference of the feature pattern between cover images and stego-images may increase with the increment of the difference between $QF_h$ and $QF_a$ ($QF_h \leq QF_a$). Hence, when $QF_a$ is constant and $QF_h$ becomes smaller, it may become easier to distinguish cover images and stego-images.

Example Computing Systems

Figure 12:
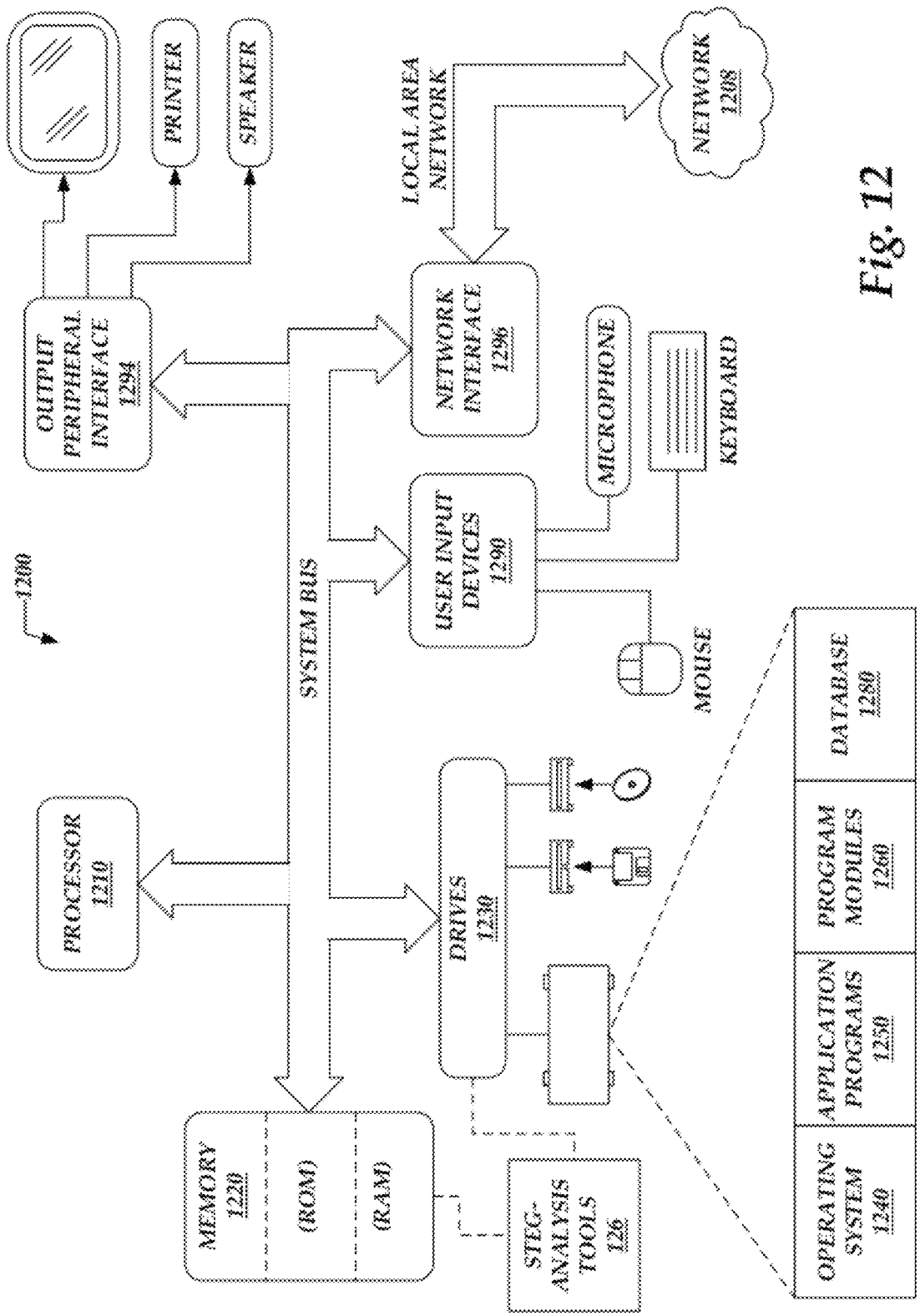
FIG. 12 is a schematic diagram illustrating an example computing system for implementing embodiments of, for example, a steganalytic system as shown in FIG. 1, all arranged in accordance with the present disclosure.

FIG. 12 is a schematic diagram illustrating an example computing system 1200 for implementing embodiments of, for example, the steganalytic system 116 shown in FIG. 1. Computing system 1200 may also be referred to as a computer, a computer system, a computer device, or a computing device. Computer system 1200 may include a processor 1210, memory 1220 and one or more drives 1230. The drives 1230 and their associated computer storage media, may be arranged to provide storage of computer readable instructions, data structures, program modules and other data for the computer system 1200. At different times during operation of the computing system 1200, software modules constituting the tools 126 for steganalysis of suspect media may be stored in the memory 1220 and/or the drives 1230. Drives 1230 may include one or more of an operating system 1240, application programs 1250, program modules 1260, or databases 1280. The tools 126 may include software modules provided as part of the application programs 950 and/or the program modules 960. Computer system 1200 may further includes user input devices 1290 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be coupled to processor 1210 through a user input interface that may be coupled to a system bus, or may be coupled by other interface and bus structures, such as a parallel port, game port or a universal serial bus (USB). Computers such as computer system 1200 may also include other peripheral output devices such as speakers, which may be connected through an output peripheral interface 1294 or the like.

Computer system 1200 may operate in a networked environment using logical connections to one or more computers, such as a remote computer coupled to network interface 1296. The remote computer may be a personal computer (PC), a server, a router, a network PC, a peer device or other common network node, and can include many or all of the elements described above relative to computer system 1200. Networking environments are commonplace in offices, enterprise-wide area networks (WAN), local area networks (LAN), wireless LANs (WLAN), intranets and world-wide networks such as the Internet. For example, in the subject matter of the present disclosure, computer system 1200 may comprise the source machine from which data is being migrated, and the remote computer may comprise the destination machine or vice versa. Note however, that source and destination machines need not be connected by a network 1208 or any other means, but instead, data may be migrated via any media capable of being written by the source platform and read by the destination platform or platforms. When used in a LAN or WLAN networking environment, computer system 1200 may be coupled to the LAN through a network interface 1296 or an adapter. When used in a WAN networking environment, computer system 1200 may include a modem or other means for establishing communications over the WAN, such as the Internet or network 1208 It will be appreciated that other means of establishing a communications link between the various computer systems and devices may be used.

According to some embodiments, the computer system 1200 may be coupled in a networking environment. In such networking environments, the processor 1210 and/or program modules 1260 can cooperate with other similarly configured computers 1220 to perform steganalysis of suspect media in accordance with such embodiments described herein.

CONCLUSION

As described above, the foregoing description provided examples relating to YASSv1, where one E-block may be used in one B-block. However, the tools and techniques described herein may also be extended to YASSv2, in which more than one E-block may be used in a large B-block. In such a case, eligible and ineligible locations of M-blocks may be identified, if B is given. In addition, the multi-class classification strategy may be adapted to identify B when B is limited in some ranges, even if it is unknown to a warden.

If $QF_h$ is varying within an image, the embedding rate can increase and the embedded data can be more robust to the final JPEG compression. Since the steganalytic techniques described herein only use $QF_a$ and need not know $QF_h$, these steganalytic methods may nevertheless operate in scenarios when $QF_h$ is a not constant.

It will be appreciated that the foregoing description provides processes, systems, components, and computer readable storage media (collectively, tools and/or techniques) may effect various transformations in representations of physical items. For example, the steganalytic system 116 may be implemented as a general-purpose computer system similar to that shown in FIG. 12. However, downloading and executing software implementations of these tools (e.g., steganalysis tools 126 shown in FIG. 1), this general-purpose computer system may transition or be transformed into a special-purpose computer system suitable for performing steganalysis of suspect media. In turn, this special-purpose computer system may process and analyze particular instances of such suspect media, and transform representations of the suspect media into corresponding output signals characterizing the suspect media as unaltered media or stego-media.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or processes, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A non-transitory computer-readable storage medium storing computer-executable instructions to process one or more instances of suspect media that include a plurality of data elements, the computer-executable instructions comprising:
dividing an instance of suspect media into non-overlapping consecutive blocks, wherein each of the non-overlapping consecutive blocks includes B×B data elements;
identifying a first quantized block of the data elements, wherein the first quantized block includes a first M×M subset of the data elements;
determining that the first M×M subset of the data elements is eligible to be embedded with steganographic data when the first M×M subset of data elements are identified within one B×B block of the non-overlapping consecutive blocks and not in two or more B×B blocks of the non-overlapping consecutive blocks;
identifying a second quantized block of the data elements, wherein the second quantized block includes a second M×M subset of the data elements;
determining that the second quantized block of the data elements is ineligible to be embedded with steganographic data when the second M×M subset of data elements are identified in two or more B×B blocks of the non-overlapping consecutive blocks and not within one B×B block of the non-overlapping consecutive blocks;
requantizing the first quantized block and the second quantized block of the data elements;
comparing statistics resulting from requantizing the first quantized block with further statistics resulting from requantizing the second quantized block; and
assessing whether the instance of suspect media is embedded with steganalytic features based on comparing the statistics to the further statistics.

2. The non-transitory computer-readable storage medium of claim 1, further comprising receiving the one or more instances of suspect media as input for steganalytic processing, and wherein the data elements comprise pixels.

3. The non-transitory computer-readable storage medium of claim 2, wherein receiving the one or more instances of suspect media comprises receiving one or more images, and wherein assessing whether the one or more instances of suspect media is embedded with steganalytic features comprises determining that at least one image is a stego-image, and extracting the steganalytic features from the image.

4. The non-transitory computer-readable storage medium of claim 3, wherein receiving one or more images comprises receiving one or more JPEG images.

5. The non-transitory computer-readable storage medium of claim 1, wherein comparing statistics comprises comparing a first quantity of zero-valued coefficients occurring in the statistics generated for the first quantized block to a second quantity of zero-valued coefficients occurring in the statistics generated for the second quantized block.

6. The non-transitory computer-readable storage medium of claim 5, further comprising determining that the instance of the suspect media is stego-media when the first quantity of zero-valued coefficients occurring in the statistics for the first quantized block is determined to be greater than the second quantity of zero-valued coefficients occurring in the statistics for the second quantized block.

7. The non-transitory computer-readable storage medium of claim 5, further comprising determining that the instance of the suspect media is non-stego-media when the first quantity of zero-valued coefficients occurring in the statistics for the first quantized block is determined to be approximately equal to the second quantity of zero-valued coefficients occurring in the statistics for the second quantized block.

8. The non-transitory computer-readable storage medium of claim 1, wherein requantizing the first and second quantized blocks include performing a two-dimensional discrete cosine transformation (DCT) on the first and second quantized blocks to generate respective sets of DCT coefficients associated with the first and second quantized blocks, and rounding one or more of the DCT coefficients to have values of zero.

9. The non-transitory computer-readable storage medium of claim 1, wherein the identifying the first and the second quantized blocks of data elements include defining two-dimensional blocks that includes two or more of the plurality of data elements.

10. The non-transitory computer-readable storage medium of claim 9, wherein the first M×M subset of the data elements comprise a first 8×8 subset of the data elements; and wherein the second M×M subset of the data elements comprises a second 8×8 subset of the data elements.

11. The non-transitory computer-readable storage medium of claim 10, wherein determining that the first M×M subset of the data elements is eligible to be embedded with stenographic data comprises identifying as eligible the first 8×8 subset of the data elements that fall entirely within one of the non-overlapping consecutive blocks.

12. The non-transitory computer-readable storage medium of claim 10, wherein determining that the second M×M subset of the data elements is ineligible to be embedded with stenographic data comprises identifying as ineligible the second 8×8 subset of the data elements that span at least two of the non-overlapping consecutive blocks.

13. A non-transitory computer-readable storage medium storing computer-executable instructions to process one or more instances of stego-media that include a plurality of data elements, the computer-executable instructions comprising:
dividing a representation of the stego-media into a first two-dimensional block, wherein the first two-dimensional block comprises a first number of the plurality of data elements;
collecting a plurality of second two-dimensional blocks from within the first two-dimensional block, wherein each of the plurality of second two-dimensional blocks comprises a second number of data elements, wherein the second number of data elements is less than or equal to the first number of data elements;
performing a two-dimensional discrete cosine transformation (DCT) on the plurality of second two-dimensional blocks;
quantizing DCT coefficients that result from the two-dimensional DCT;
computing a frequency at which rounded values of the DCT coefficients substantially equal zero, wherein the frequency comprises a ratio of the rounded values of the DCT coefficients that substantially equal zero relative to a total number of the rounded values of the DCT coefficients including rounded values of the DCT coefficients that do not substantially equal zero; and
extracting stego features from the stego-media based at least in part on the computed frequency at which the DCT coefficients have rounded values of substantially zero.

14. The non-transitory computer-readable storage medium of claim 13, further comprising collecting the plurality of second two-dimensional blocks such that blocks having 8×8 data elements are collected.

15. The non-transitory computer-readable storage medium of claim 13, further comprising cropping a plurality of rows and columns from an image to generate a further image as a subset of the image, wherein the image is associated with the instance of the stego media.

16. The non-transitory computer-readable storage medium of claim 15, further comprising extracting steganographic features from the further image.

17. The non-transitory computer-readable storage medium of claim 13, wherein the instance of the stego media is associated with a JPEG image.

18. The non-transitory computer-readable storage medium of claim 13, wherein a processor is further configured in cooperation with the computer-readable storage medium to transfer the instance of the stego media from the computer-readable storage medium to a memory.

19. An apparatus configured to process one or more instances of suspect media that includes a plurality of data elements, the apparatus comprising:
    a processor; and
    a computer-readable storage medium containing computer-executable instructions which are executed by the processor and cause the processor to:
        divide the suspect media into non-overlapping consecutive blocks, wherein each of the non-overlapping consecutive blocks includes B×B data elements;
        identify a first quantized block of the data elements, wherein the first quantized block includes a first M×M subset of the data elements;
        determine that the first M×M subset of the data elements is eligible to be embedded with steganographic data when the first M×M subset of data elements are identified within one B×B block of the non-overlapping consecutive blocks and not in two or more B×B blocks of the non-overlapping consecutive blocks;
        identify a second quantized block of the data elements, wherein the second quantized block includes a second M×M subset of the data elements;
        determine that the second quantized block of the data elements is ineligible to be embedded with steganographic data when the second M×M subset of data elements are identified in two or more of the non-overlapping consecutive blocks and not within one B×B block of the non-overlapping consecutive blocks;
        requantize the first quantized block and the second quantized block of the data elements;
        compare statistics resulting from requantizing the first quantized block with further statistics resulting from requantizing the second quantized block; and
        assess whether the suspect media is embedded with steganographic features based on comparing the statistics with the further statistics.

20. The apparatus of claim 19, wherein the data elements comprise pixels of an image.

21. The apparatus of claim 20, wherein the image comprises a JPEG image.

22. An apparatus configured to process one or more instances of stego-media that includes a plurality of data elements, the apparatus comprising:
    a processor; and
    a computer-readable storage medium containing computer-executable instructions which are executed by the processor and cause the processor to:
        divide a representation of the stego-media into a first two-dimensional block, wherein the first two-dimensional block comprises a first number of the plurality of data elements;
        collect a plurality of second two-dimensional blocks from within the first two-dimensional block, wherein each of the plurality of second two-dimensional blocks comprises a second number of data elements, wherein the second number of data elements is less than or equal to the first number of data elements;
        perform a two-dimensional discrete cosine transformation (DCT) on the plurality of second two-dimensional blocks;
        quantize DCT coefficients that result from the two-dimensional DCT;
        compute a frequency at which rounded values of the DCT coefficients substantially equal zero, wherein the frequency comprises a ratio of the rounded values of the DCT coefficients that substantially equal zero relative to a total number of the rounded values of the DCT coefficients including rounded values of the DCT coefficients that do not substantially equal zero; and
        extract stego features from the stego-media based at least in part on the computed frequency at which the DCT coefficients have rounded values of substantially zero.

23. The apparatus of claim 22, wherein the data elements comprise pixels of an image.

24. The apparatus of claim 23, wherein the image comprises a JPEG image.

* * * * *

UNITED STATES PATENT AND TRADEMARK OFFICE
CERTIFICATE OF CORRECTION

PATENT NO. : 8,281,138 B2
APPLICATION NO. : 12/422677
DATED : October 2, 2012
INVENTOR(S) : Shi et al.

It is certified that error appears in the above-identified patent and that said Letters Patent is hereby corrected as shown below:

On Title Page 2, in Item (56), under "OTHER PUBLICATIONS", in Column 1, Line 16, delete "et al..," and insert -- et al., --, therefor.

On Title Page 2, in Item (56), under "OTHER PUBLICATIONS", in Column 2, Line 29, delete "Stenography,"" and insert -- Steganography," --, therefor.

In the Specification

In Column 8, Line 52, delete "$]M/8\lceil \times ]N/8\lceil \times T_2,$ where $]A\lceil$," and insert -- $\lceil M/8 \rceil \times \lceil N/8 \rceil \times T_2,$ where $\lceil A \rceil$ --, therefor.

In Column 8, Line 59, after Equation insert -- . --.

In Column 9, Lines 33-34, delete "[(2k-1)Δ, (2k+1)Δ)" and insert -- [(2k-1)Δ, (2k+1)Δ] --, therefor.

In Column 9, Line 36, delete "[2kΔ, (2k+2)Δ)" and insert -- [2kΔ, (2k+2)Δ] --, therefor.

In Column 10, Line 39, delete "[-0.5, 0.5)." and insert -- [-0.5, 0.5]. --, therefor.

In Column 10, Line 42, delete "[-0.5, 0.5)." and insert -- [-0.5, 0.5]. --, therefor.

In Column 10, Line 46, delete "[-Δ, -0.5) and [0.5, Δ)" and insert -- [-Δ, -0.5] and [0.5, Δ] --, therefor.

In Column 14, Line 19, delete "$B^2-(B--8+1)^2$" and insert -- $B^2-(B-8+1)^2$ --, therefor.

Signed and Sealed this
Eighth Day of October, 2013

Teresa Stanek Rea
*Deputy Director of the United States Patent and Trademark Office*

CERTIFICATE OF CORRECTION (continued)
U.S. Pat. No. 8,281,138 B2

In the Claims

In Column 22, Lines 24-25, in Claim 11, delete "stenographic" and insert -- stegnographic --, therefor.

In Column 22, Line 31, in Claim 12, delete "stenographic" and insert -- stegnographic --, therefor.